(12) United States Patent
Kondo et al.

(10) Patent No.: US 9,783,155 B2
(45) Date of Patent: Oct. 10, 2017

(54) VEHICLE SEAT BELT DEVICE AND OCCUPANT PROTECTION SYSTEM

(71) Applicant: TOYOTA JIDOSHA KABUSHIKI KAISHA, Toyota-shi, Aichi-ken (JP)

(72) Inventors: Toru Kondo, Toyoake (JP); Mitsuyoshi Ohno, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/204,323

(22) Filed: Jul. 7, 2016

(65) Prior Publication Data

US 2017/0057459 A1 Mar. 2, 2017

(30) Foreign Application Priority Data

Aug. 25, 2015 (JP) ................. 2015-166000

(51) Int. Cl.
*B60R 22/04* (2006.01)
*B60R 22/00* (2006.01)
(Continued)

(52) U.S. Cl.
CPC ............ *B60R 22/04* (2013.01); *B60N 2/4606* (2013.01); *B60N 2/468* (2013.01); *B60R 21/207* (2013.01);
(Continued)

(58) Field of Classification Search
CPC ....... B60R 22/04; B60R 21/207; B60R 22/00; B60R 22/195; B60R 22/26; B60R 22/34; B60R 22/48; B60R 2021/0032; B60R 2021/0048; B60R 2021/2074; B60R 2022/1818; B60R 2022/1957; B60R 2022/4808; B60N 2/4606; B60N 2/468
See application file for complete search history.

(56) References Cited

U.S. PATENT DOCUMENTS 4,629,214 A * 12/1986 Fohl ................. B60R 22/03
280/808
5,123,673 A * 6/1992 Tame .................. B60R 22/03
100/268
(Continued)

FOREIGN PATENT DOCUMENTS

JP 2007-137177 A 6/2007
JP 2009-154745 A 7/2009
(Continued)

*Primary Examiner* — Philip Gabler
(74) *Attorney, Agent, or Firm* — Oliff PLC

(57) ABSTRACT

An occupant protection system includes: arm rests that are disposed on first and second width direction sides of a seat back and are rotatable between a substantially vertical storage position and a substantially horizontal use position; slide members that are slidable along the arm rests and have belt guides; a retractor that takes up webbing of a belt; and an electronic control unit that, (i) in a state before an occupant is seated in a vehicle seat, causes the arm rests to be held in the storage position and causes the slide members to slide in the seat upward direction above the head of the occupant, and that, (ii) when the occupant is seated, causes the arm rests to rotate to the use position, causes the slide members to slide toward base sides of the arm rests, and causes the webbing to be taken up by the retractor.

13 Claims, 16 Drawing Sheets

(51) Int. Cl.
  *B60N 2/46*    (2006.01)
  *B60R 21/207*  (2006.01)
  *B60R 22/195*  (2006.01)
  *B60R 22/26*   (2006.01)
  *B60R 22/34*   (2006.01)
  *B60R 22/48*   (2006.01)
  *B60R 21/00*   (2006.01)
  *B60R 22/18*   (2006.01)

(52) U.S. Cl.
  CPC ............ *B60R 22/00* (2013.01); *B60R 22/195* (2013.01); *B60R 22/26* (2013.01); *B60R 22/34* (2013.01); *B60R 22/48* (2013.01); *B60R 2021/0032* (2013.01); *B60R 2021/0048* (2013.01); *B60R 2021/2074* (2013.01); *B60R 2022/1818* (2013.01); *B60R 2022/1957* (2013.01); *B60R 2022/4808* (2013.01)

(56) References Cited

U.S. PATENT DOCUMENTS

| | | | |
|---|---|---|---|
| 5,393,097 A * | 2/1995 | Townsend | B60J 5/06 280/801.1 |
| 5,505,491 A | 4/1996 | Townsend | |
| 5,538,283 A * | 7/1996 | Townsend | B60J 5/06 280/801.1 |
| 5,938,237 A * | 8/1999 | Abels | B60J 5/0487 180/282 |
| 6,267,409 B1 | 7/2001 | Townsend et al. | |
| 6,305,713 B1 | 10/2001 | Pywell et al. | |
| 6,550,867 B2 * | 4/2003 | Rogers, Jr. | B60R 22/03 280/808 |
| 8,016,318 B2 * | 9/2011 | Nezaki | B60N 2/002 280/733 |
| 8,042,866 B2 * | 10/2011 | Kling | B60R 22/20 280/801.1 |
| 2002/0195868 A1 * | 12/2002 | Tsai | B60N 2/265 297/487 |

FOREIGN PATENT DOCUMENTS

| | | |
|---|---|---|
| JP | 2009-214842 A | 9/2009 |
| JP | 2009-279985 A | 12/2009 |
| JP | 2010-058722 A | 3/2010 |
| JP | 2011-016480 A | 1/2011 |

\* cited by examiner

VEHICLE SEAT BELT DEVICE AND OCCUPANT PROTECTION SYSTEM

CROSS-REFERENCE TO RELATED APPLICATION

This application claims priority under 35 USC 119 from Japanese Patent Application No. 2015-166000 filed Aug. 25, 2015, the entire disclosure of which is incorporated by reference herein.

BACKGROUND

Technical Field

The disclosure relates to a vehicle seat belt device and an occupant protection system.

Related Art

As a seat belt device that can automatically engage and disengage a seat belt, Japanese Patent Application Laid-open (JP-A) No. 2009-279985 discloses a structure where motors disposed on a vehicle seat and take-up members attached to a roof are coupled to each other in the seat up and down direction by wires. Furthermore, the structure is disposed with joints that are movable in the seat up and down direction along the wires, and a belt (webbing) whose end portions are anchored to the roof and that bridges the joints. Additionally, the belt is placed on the roof side together with the joints in a state before engagement (with the vehicle occupant), and the motors are driven after an occupant is seated in the vehicle seat so that the joints are moved in the seat downward direction and the seat belt becomes engaged (with the occupant).

However, in the technology disclosed in JP-A No. 2009-279985, each end portion of the webbing is anchored to the roof, so the facing direction of the vehicle seat and the position of the vehicle seat cannot be freely changed. For this reason, it is desirable to provide a vehicle seat belt device that can automatically engage and disengage the seat belt even in cases where, owing to the development of sophisticated driving assist technologies and automatic driving technologies, it has become possible to freely adjust the facing direction of the vehicle seat and the position of the vehicle seat.

SUMMARY

In consideration of the circumstances described above, the disclosed embodiments provide a vehicle seat belt device and an occupant protection system that can automatically engage and disengage a seat belt regardless of the facing direction of the vehicle seat and the position of the vehicle seat.

A vehicle seat belt device pertaining to a first aspect includes: a pair of arm rests that are disposed on first and second width direction sides of a seat back of a vehicle seat and that are rotatable between a storage position, in which the arm rests extend substantially vertically, and a use position, in which the arm rests are tilted in a seat forward direction from the storage position and extend substantially horizontally; slide members that are respectively disposed at the pair of arm rests and that are slidable along the arm rests, distal end portions of the slide members having belt guides through which webbing of a belt is passed; a belt anchor that is disposed on the first width direction side of a lower portion of the seat back, and to which a first end portion of the webbing is attached; a retractor that is disposed on the second width direction side of the lower portion of the seat back, and that takes up a second end portion of the webbing that has passed through the belt guides on both of the first and second width direction sides; and an electronic control unit that, (i) in a state before an occupant is seated in the vehicle seat, causes the pair of arm rests to be held in the storage position and causes the slide members to be held in a state in which the slide members have been moved further in a seat upward direction than a head rest of the vehicle seat, and that, (ii) in a state in which the occupant is seated, causes the pair of arm rests to rotate from the storage position to the use position, causes the slide members to slide toward base sides of the arm rests, and causes a predetermined amount of the webbing to be taken up by the retractor.

In the vehicle seat belt device pertaining to the first aspect, the pair of arm rests are disposed on first and second width direction sides of the vehicle seat. Furthermore, the pair of arm rests are rotatable between the storage position in which the arm rests extend substantially vertically and the use position in which the arm rests are tilted in the seat forward direction from the storage position and extend substantially horizontally. Moreover, the slide members that are slidable along the arm rests are respectively disposed at the pair of arm rests, and the distal end portions of the slide members have the belt guides through which the webbing is passed. Furthermore, the belt anchor to which the first end portion of the webbing is attached is disposed on the first width direction side of the lower portion of the seat back, and the retractor that takes up the second end portion of the webbing is disposed on the second width direction side of the lower portion of the seat back. Additionally, the webbing extends from the belt anchor, is passed through the belt guides on the first and second width direction sides, and thereafter is taken up in the retractor. Here, in a state before the occupant is seated in the vehicle seat, the pair of arm rests are held in the storage position by the electronic control unit. Furthermore, the slide members are held in a state in which they have been moved further in the seat upward direction than the head rest. In this way, by holding the slide members in a state in which they have been moved in the seat upward direction, the head of the occupant is kept from getting in the way of the webbing when the occupant is seated.

When the occupant is seated, the pair of arm rests are rotated (tilted) to the use position by the electronic control unit, Because of this, the webbing between the belt guides on the first and second width direction sides is placed on the seat front side of the pelvis of the occupant. Furthermore, the electronic control unit causes the slide members to slide toward the base sides of the arm rests. Because of this, the belt guides are moved toward the occupant side (the seat rearward direction). Furthermore, the electronic control unit causes a predetermined amount of the webbing to be taken up by the retractor, so that the excess length of the webbing is taken up and a so-called two-point seat belt can be automatically engaged. It should be noted that "automatic" here is a concept that is not limited to a configuration where the seat belt becomes engaged without the occupant performing any sort of operation after being seated, and includes a configuration where the seat belt becomes engaged as a result of the occupant operating a button or the like after being seated. Furthermore, the engaged state of the two-point seat belt becomes canceled as a result of the belt guides being slid toward the distal end sides of the arm rests as the webbing is unwound in an opposite process and the arm rests being rotated to the storage position. In the way described above, the two-point seat belt can be automatically engaged and disengaged.

Moreover, the seat belt device is not attached to a roof or the like of the vehicle, so even in a case where the facing direction of the vehicle seat or the position of the vehicle seat changes, the two-point seat belt can be automatically engaged and disengaged.

A vehicle seat belt device pertaining to a second embodiment includes: a pair of arm rests that are disposed on first and second width direction sides of a seat back of a vehicle seat and that are rotatable between a storage position, in which the arm rests extend substantially vertically, and a use position, in which the arm rests are tilted in a seat forward direction from the storage position and extend substantially horizontally; slide members that are respectively disposed at the pair of arm rests and that are slidable along the arm rests, distal end portions of the slide members having belt guides through which webbing of a belt is passed; a first belt anchor that is disposed on the first width direction side of a lower portion of the seat back, and to which one end portion of the webbing is attached; a second belt anchor that is disposed on a second width direction side of the lower portion of the seat back, and in which the webbing extending from the first belt anchor is looped after having passed through the belt guides on both of the first and second width direction sides; a retractor that is disposed on one seat width direction end side of an upper end portion of the seat back, and that takes up a second end portion of the webbing that has been looped through the second belt anchor and passed through the belt guide on the second width direction side; and an electronic control unit that, (i) in a state before an occupant is seated in the vehicle seat, causes the pair of arm rests to be held in the storage position and causes the slide members to be held in a state in which the slide members have been moved further in a seat upward direction than a head rest of the vehicle seat, and that, (ii) in a state in which the occupant is seated, causes the pair of arm rests to rotate from the storage position to the use position, causes the slide members to slide toward base sides of the arm rests, and causes a predetermined amount of the webbing to be taken up by the retractor.

In the vehicle seat belt device pertaining to the second aspect, the first belt anchor to which the first end portion of the webbing is attached is disposed on the first width direction side of the lower portion of the seat back. The second belt anchor is disposed on the second width direction side of the lower portion of the seat back, and the webbing that extends from the first belt anchor and that has passed through the belt guides on both the first and second width direction sides is looped through the second belt anchor. Furthermore, the retractor is disposed on the one seat width direction end side of the upper end portion of the seat back, and the webbing that has been looped through the second belt anchor and passed through the belt guide on the second seat width direction side is taken up in the retractor. For this reason, the webbing extends from the first belt anchor, is passed through the belt guides of the pair of arm rests, thereafter is looped through the second belt anchor, is again passed though the belt guide on the second width direction side, and thereafter is taken up in the retractor. Because of this, when the arm rests are rotated (tilted) to the use position by the electronic control unit when the occupant is seated, the section of the webbing between the first belt anchor and the second belt anchor becomes a lap belt placed on the seat front side of the pelvis of the occupant. Furthermore, the section of the webbing between the second belt anchor and the retractor becomes a shoulder belt placed diagonally over the seat front side of the occupant from the shoulders to the pelvis. Furthermore, the slide members are moved toward the base sides of the arm rests by the electronic control unit, so that the belt guides are moved toward the occupant side (the seat rearward direction). Moreover, a predetermined amount of the webbing is taken up by the retractor, so that the excess length of the webbing is taken up and a so-called three-point seat belt can be automatically engaged. Furthermore, the engaged state of the three-point seat belt can be canceled as a result of the belt guides being moved toward the distal end sides of the arm rests as the webbing is unwound in an opposite process and the arm rests being rotated to the storage position. In the way described above, the three-point seat belt can be automatically engaged and disengaged.

Furthermore, the seat belt device is not attached to a roof or the like of the vehicle, so even in a case where the facing direction of the vehicle seat or the position of the vehicle seat changes, the three-point seat belt can be automatically engaged and disengaged.

A vehicle seat belt device pertaining to a third aspect includes the second aspect, and further includes a tubular member that is flexible and, in a state in which the arm rests are held in the storage position, extends from the retractor along a side portion of the head rest to a position further in the seat upward direction than the head rest and further on the first width direction end side than the head rest, and the webbing is inserted into the tubular member.

In the vehicle seat belt device pertaining to the third aspect, in the three-point seat belt the webbing is inserted into the tubular member that is flexible, so in a state in which the arm rests are held in the storage position the second end portion of the webbing can be kept from getting in the way of the head and so forth of the occupant. Furthermore, the tubular member is flexible, so at the time of seat belt engagement the tubular member bends in conformity to the build of the occupant, so that the seat belt can be made to fit the occupant.

A vehicle seat belt device pertaining to a fourth aspect includes any one of the first aspect to the third aspect, and further includes extendable and contractible coupling members that couple the belt guides to the slide members.

In the vehicle seat belt device pertaining to the fourth aspect, the belt guides and the slide members are coupled to each other by the extendable and contractible coupling members. Because of this, by taking up the webbing with the retractor at the time of seat belt engagement and the like, the coupling members become extended so that the belt guides can be moved toward the retractor side. As a result, the webbing can be pulled closer toward the occupant side.

A vehicle seat belt device pertaining to a fifth aspect includes any one of the first aspect to the fourth aspect, wherein the electronic control unit causes the predetermined amount of the webbing to be taken up by the retractor at a time of a crash of the vehicle or at a time at which a crash of the vehicle is predicted.

In the vehicle seat belt device pertaining to the fifth aspect, the force with which the occupant is restrained can be enhanced by causing a predetermined amount of the webbing to be taken up by the retractor at the time of a crash of the vehicle or at the time at which a crash of the vehicle is predicted. Because of this, the ability to initially restrain the occupant can be improved.

A vehicle seat belt device pertaining to a sixth aspect includes any one of the first aspect to the fifth aspect, wherein each of the arm rests includes: a wire extending between a rotating shaft of the arm rest and the slide member, and a spring that urges the slide member away from the rotating shaft, wherein a first end portion of the wire is wound about a periphery of the rotating shaft, and, as the arm rest is rotated from the storage position to the use position, the first end portion of the wire is taken up on the periphery of the rotating shaft.

In the vehicle seat belt device pertaining to the sixth aspect, when each of the arm rests is rotated from the storage position to the use position, the first end portion of the wire is taken up on the periphery of the rotating shaft of the arm rest. Because of this, the slide member is moved toward the base side of the arm rest counter to the urging force of the spring. In this way, by simply rotating the arm rest from the storage position to the use position, the belt guide can be moved toward the base side of the arm rest via the slide member. Furthermore, conversely, in a case where each of the arm rests has been returned from the use position to the storage position, the one end portion of the wire is unwound. Additionally, the slide member is moved toward the distal end side of the arm rest by the urging force of the spring.

A vehicle seat belt device pertaining to a seventh aspect includes any one of the first aspect to the fifth aspect, wherein each of the arm rests includes: a first gear attached to a rotating shaft of the arm rest, a pulley having a second gear that has a fewer number of teeth than the first gear and meshes with the first gear, a wire extending between the pulley and the slide member, and a spring that urges the slide member away from the rotating shaft, wherein a first end portion of the wire is wound about the pulley, and, as the arm rest is rotated from the storage position to the use position, the first end portion of the wire is taken up on the pulley.

In the vehicle seat belt device pertaining to the seventh aspect, when each of the arm rests is rotated from the storage position to the use position, the first gear rotates together with the rotating shaft of the arm rest. Additionally, the second gear is rotated in accompaniment with the rotation of the first gear, so that the pulley rotates and the wire is taken up. Because of this, the slide member is moved toward the base side of the arm rest counter to the urging force of the spring. In this way, by simply rotating the arm rest from the storage position to the use position, the belt guide can be moved toward the base side of the arm rest via the slide member. Furthermore, the second gear that meshes with the first gear has a fewer number of teeth than the first gear, so the number of rotations of the second gear increases and the moving amount of the slide member can be increased. Moreover, in a case where the arm rest has been returned from the use position to the storage position, the first gear is rotated in the reverse direction so that the wire is unwound. Additionally, the slide member is moved toward the distal end side of the arm rest by the urging force of the spring.

An occupant protection system pertaining to an eighth aspect includes: the vehicle seat belt device pertaining to any one of the first aspect to the seventh aspect; an airbag configured as a single bag that is stored in the head rest of the vehicle seat, and that is inflated and deployed upon being supplied with gas, the airbag deploying in a seat forward direction and in seat sideward directions to cover a head of the occupant; and an upper body restraining portion that is disposed at a forwardly deploying portion of the airbag deployed on a seat front side, the upper body restraining portion configured to restrain at least one of a breast and shoulders of the occupant.

In the occupant protection system pertaining to the eighth aspect, the airbag is inflated and deployed at the time of a crash of the vehicle, so that the head of the occupant is protected. Furthermore, the upper body restraining portion is disposed at the forwardly deploying portion of the airbag that is deployed on the seat front side, and at least one of the breast and the shoulders of the occupant is restrained by the upper body restraining portion. In this way, the upper body of the occupant is restrained by the airbag stored in the head rest. Meanwhile, the lower body of the occupant is restrained by the two-point seat belt or the three-point seat belt automatically engaged by the seat belt device. Because of this, the upper body and the lower body of the occupant can be restrained at the time of a crash of the vehicle regardless of the facing direction of the vehicle seat and the position of the vehicle seat.

As described above, according to the vehicle seat belt device pertaining to the first aspect, the vehicle seat belt device has the superior effect that a two-point seat belt can be automatically engaged and disengaged regardless of the facing direction of the vehicle seat and the position of the vehicle seat.

According to the vehicle seat belt device pertaining to the second aspect, the vehicle seat belt device has the superior effect that a three-point seat belt can be automatically engaged and disengaged regardless of the facing direction of the vehicle seat and the position of the vehicle seat.

According to the vehicle seat belt device pertaining to the third aspect, the vehicle seat belt device has the superior effect that the webbing can be kept from getting in the way of the head of the occupant at the time of engagement of the three-point seat belt.

According to the vehicle seat belt device pertaining to the fourth aspect, the vehicle seat belt device has the superior effect that the webbing can be made to fit the occupant regardless of the build and the seated posture of the occupant.

According to the vehicle seat belt device pertaining to the fifth aspect, the vehicle seat belt device has the superior effect that the ability to initially restrain the occupant can be improved.

According to the vehicle seat belt device pertaining to the sixth aspect and the seventh aspect, the vehicle seat belt device has the superior effect that the belt guides can be moved in accordance with the rotational motion of the arm rests without having to dispose dedicated actuators for causing the belt guides to slide.

According to the occupant protection system pertaining to the eighth aspect, the occupant protection system has the superior effect that the upper body and the lower body of the occupant can be restrained at the time of a crash of the vehicle regardless of the facing direction of the vehicle seat and the position of the vehicle seat.

BRIEF DESCRIPTION OF THE DRAWINGS

Embodiments will be described in detail based on the following figures, wherein.

DETAILED DESCRIPTION

First Embodiment

Figure 1:
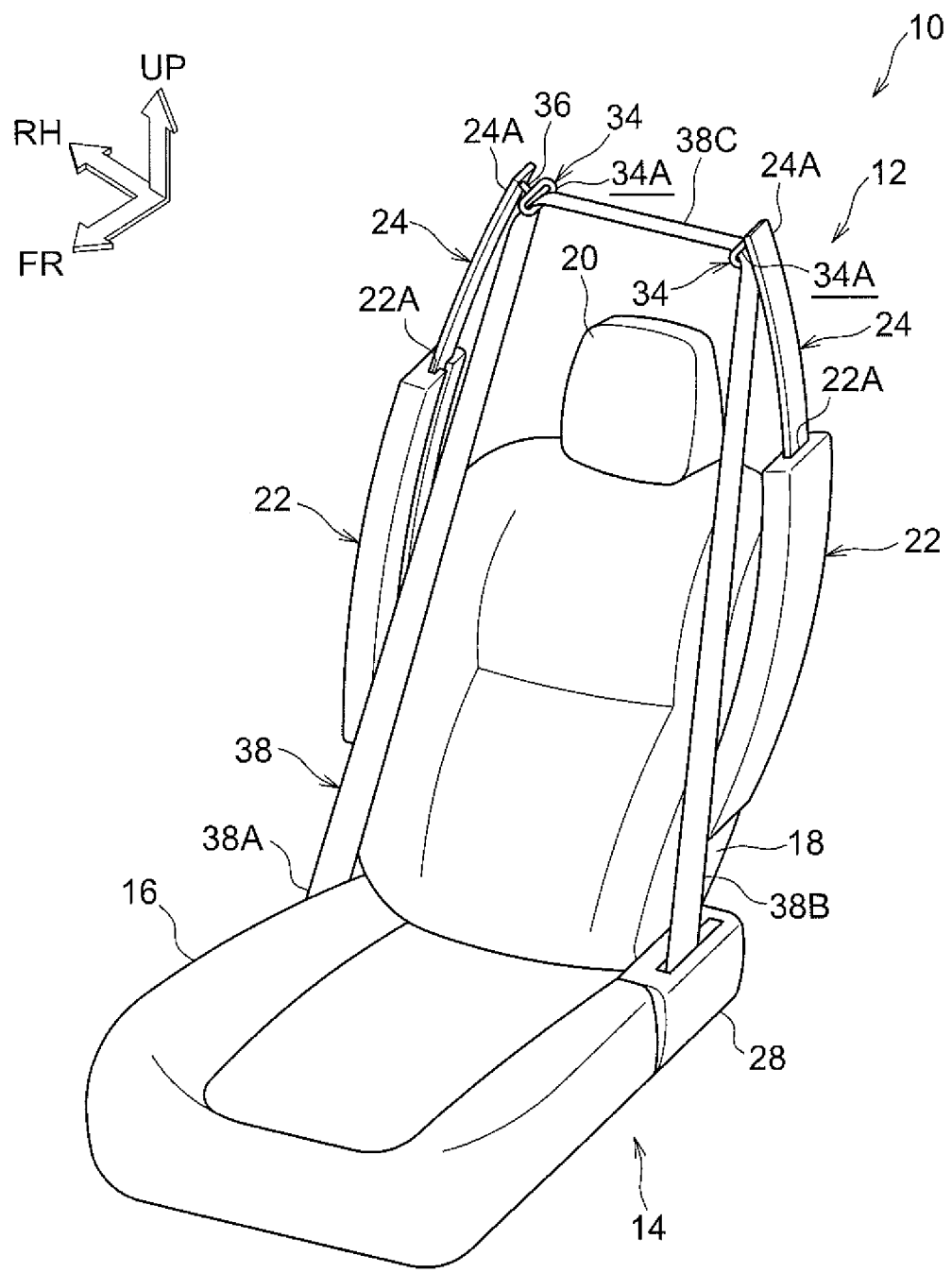
FIG. 1 is a perspective view, seen from a seat front side and a seat upper side, of a vehicle seat to which an occupant protection system pertaining to a first embodiment has been applied.

An occupant protection system 10 equipped with a vehicle seat belt device 12 pertaining to a first embodiment will now be described with reference to FIG. 1 to FIG. 8. It should be noted that arrow FR in the drawings indicates a seat forward direction of a vehicle seat 14 to which the vehicle seat belt device 12 has been applied, arrow UP indicates a seat upward direction, and arrow RH indicates a seat rightward direction.

Figure 2:
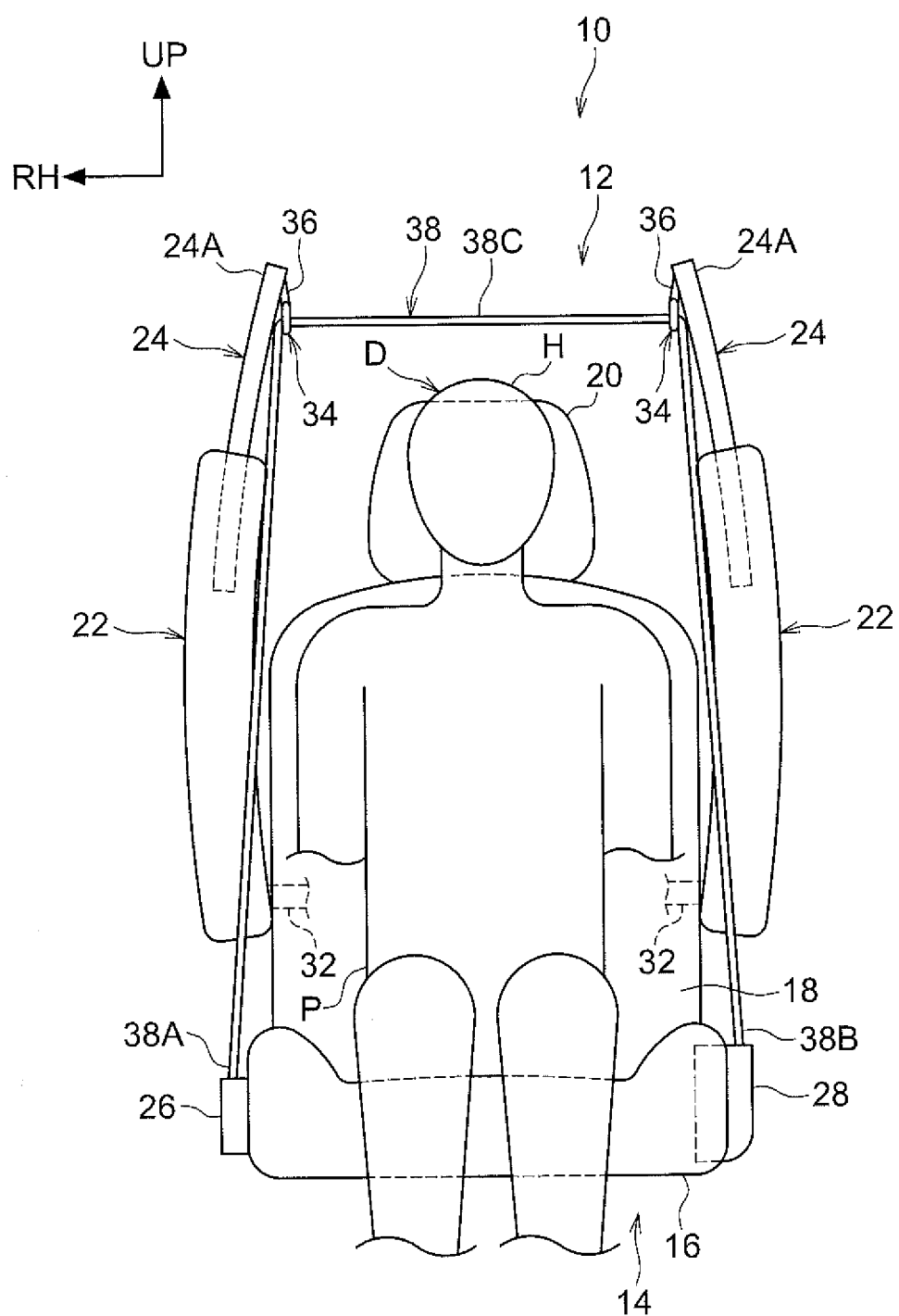
FIG. 2 is a front view, seen from the seat front side, of the vehicle seat to which the occupant protection system pertaining to the first embodiment has been applied, and is a view showing a state before seat belt engagement.
Figure 3:
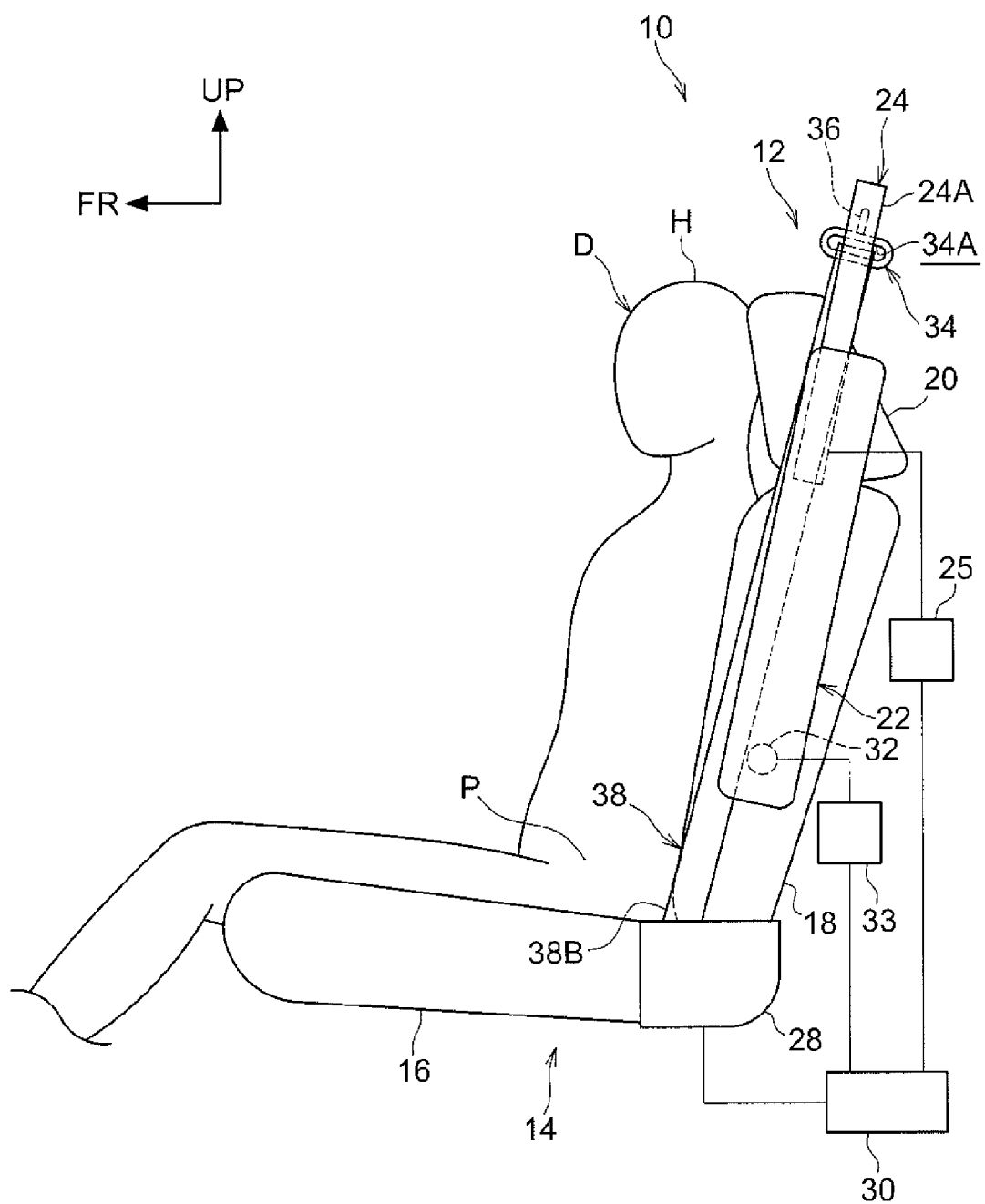
FIG. 3 is a side view, seen from outside in the seat width direction, of the vehicle seat to which the occupant protection system pertaining to the first embodiment has been applied, and is a side view of FIG. 2 showing a state before seat belt engagement.

As shown in FIG. 1 to FIG. 3, the vehicle seat 14 (hereinafter simply called "the seat 14") to which the occupant protection system 10 pertaining to the present embodiment has been applied is configured to include a seat cushion 16 and a seat back 18. Furthermore, a head rest 20 is disposed on the upper end portion of the seat back 18.

It should be noted that the drawings show a state in which a crash test dummy, serving as a model of an occupant to be protected, is seated on the seat cushion 16 of the seat 14. The dummy is, for example, World Side Impact Dummy (World-SID) AM50 (representing a 50$^{th}$ percentile American adult male). The dummy is seated in a standard seated posture determined by crash test procedures, and the seat 14 is positioned in a standard set position corresponding to the seated posture. Below, in order to facilitate understanding of the description, the dummy will be called an "occupant D".

Here, the occupant protection system 10 is disposed at the seat 14. The occupant protection device 10 is configured to include a vehicle seat belt device 12 and an airbag device 13 (see FIG. 8). Below, the configuration of the vehicle seat belt device 12 will be described on the basis of FIG. 1 to FIG. 7 and then the configuration of the airbag device 13 will be described on the basis of FIG. 8.

(Configuration of Vehicle Seat Belt Device)

As shown in FIG. 1 to FIG. 3, the vehicle seat belt device 12 is configured to include arm rests 22, slide members 24, a belt anchor 26, a retractor 28, and an electronic control unit (ECU) 30 serving as a control unit. The arm rests 22 are disposed on both seat width direction sides of the seat back 18 and are rotatable relative to the seat back 18.

Figure 4:
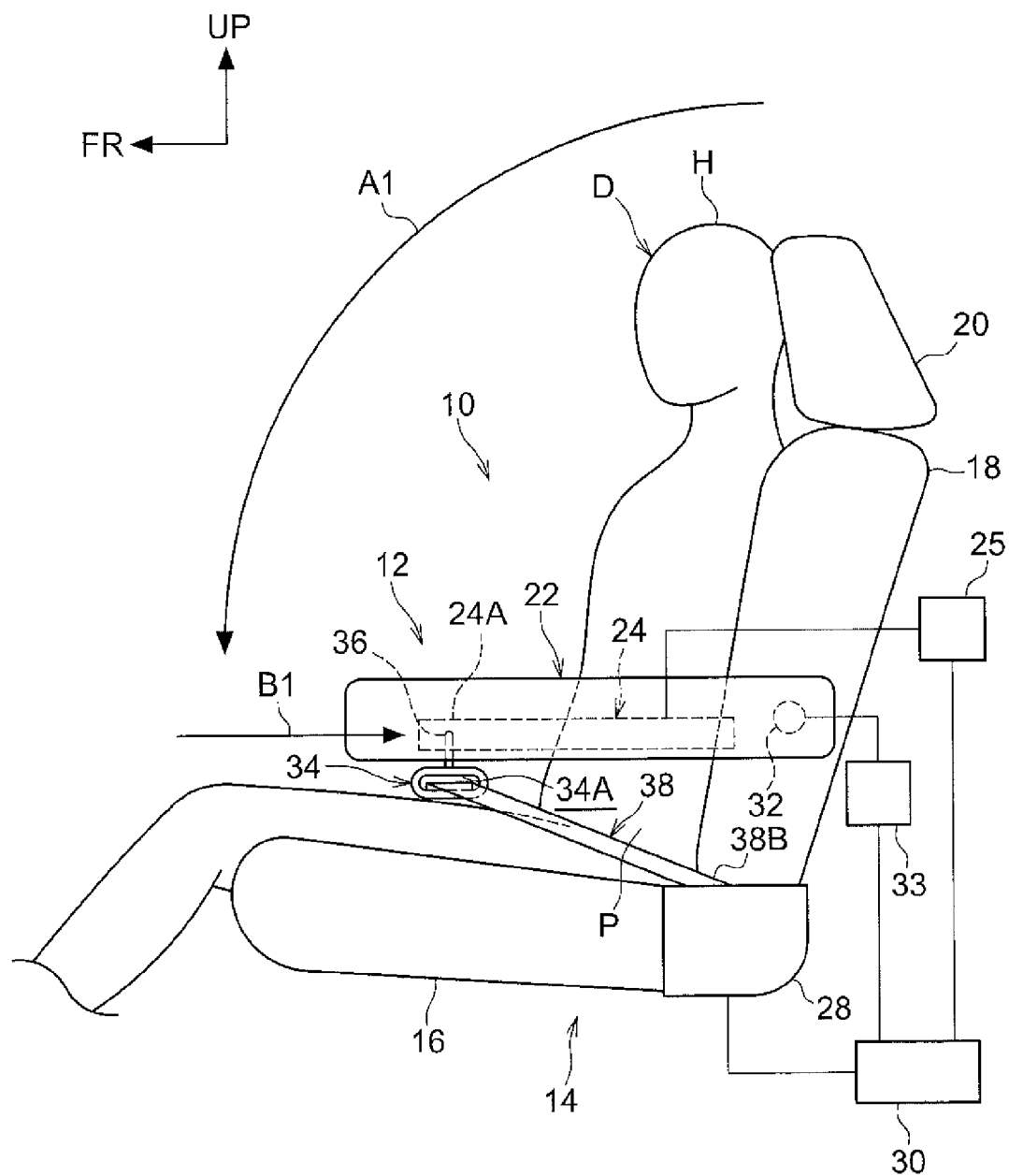
FIG. 4 is a side view, corresponding to FIG. 3, showing the vehicle seat in a state in which the seat belt is engaged.

Here, the pair of arm rests 22 are, in the state shown in FIG. 1 to FIG. 3 (a state before seat belt engagement), placed in a storage position to extend substantially vertically along the seat up and down direction. Furthermore, the lower end portions of the arm rests 22 in the storage position are coupled to the seat back 18 via rotating shafts 32. As shown in FIG. 3, the rotating shafts 32 are connected to first actuators 33 including a motor and so forth, and by driving the first actuators 33 the arm rests 22 are rotated in the seat forward direction from the storage position. When the arm rests 22 are rotated in the seat forward direction, as shown in FIG. 4, the arm rests 22 are placed in a use position to extend substantially horizontally along the seat front and rear direction. It should be noted that the first actuators 33 disposed at the rotating shafts 32 are electrically connected to the ECU 30 and rotate the arm rests 22 on the basis of a signal from the ECU 30. Details about the ECU 30 will be described later. Furthermore, in the present embodiment, the pair of arm rests 22 are configured to rotate in conjunction with each other.

As shown in FIG. 1, guide channels 22A are formed in the seat width direction inside surfaces of the arm rests 22, and the slide members 24 are slidably inserted into the guide channels 22A. As shown in FIG. 3, the slide members 24 are long members extending along the arm rests 22, and the slide members 24 are connected to second actuators 25 such as cylinders disposed inside the arm rests 22. Additionally, by driving the second actuators 25 the slide members 24 are slid along the arm rests 22. Furthermore, the second actuators 25 disposed at the slide members 24 are electrically connected to the ECU 30, and the slide members 24 are slid along the arm rests 22 on the basis of a signal from the ECU 30. Details about the ECU 30 will be described later.

Here, as shown in FIG. 2 and FIG. 3, in a state in which the arm rests 22 are held in the storage position, the slide members 24 are slid further in the seat upward direction than the arm rests 22, so that distal end portions 24A of the slide members 24 are positioned further in the seat upward direction than the head rest 20. Furthermore, as shown in FIG. 4, in a state in which the arm rests 22 are in the use position, the slide members 24 are slid toward the base sides of the arm rests 22 by the second actuators 25. Additionally, the distal end portions 24A of the slide members 24 are stored in the arm rests 22.

Substantially loop-shaped belt guides 34 are coupled to the distal end portions 24A of the slide members 24, and the belt guides 34 are equipped with pass-through holes 34A through which webbing 38 is passed. Furthermore, the belt guides 34 are coupled to the slide members 24 by extendable and contractible elastic cords 36 serving as coupling members. For this reason, when the belt guides 34 are pulled, the elastic cords 36 become extended and the belt guides 34 are moved relative to the slide members 24.

As shown in FIG. 2, the belt anchor 26 is disposed on the lower portion of the seat right side (one seat width direction side) of the seat back 18. The belt anchor 26 is attached to the section where the seat cushion 16 and the seat back 18 are coupled to each other, and one end portion 38A of the webbing 38 is anchored to the belt anchor 26.

The retractor 28 is disposed on the lower portion of the seat left side (the other seat width direction side) of the seat back 18. The retractor 28 is attached to the section where the seat cushion 16 and the seat back 18 are coupled to each other, and a non-illustrated spool is disposed inside the retractor 28. Additionally, the other end side 38B of the webbing 38 is wound about the spool. Furthermore, a non-illustrated motor is connected to the spool, and by driving the motor the spool rotates in a take-up direction so that the other end side 38B of the webbing 38 is taken up. When the webbing 38 is pulled in a no-load state in which a voltage is not being applied to the motor, the spool rotates in a pull-out direction so that the webbing 38 is pulled out (unwound).

Here, in a state in which the arm rests 22 are held in the storage position, the webbing 38 extends in the seat upward direction from the belt anchor 26, passes through the belt guide 34 on the seat right side, and extends toward the seat left side. Furthermore, the webbing 38 passes through the belt guide 34 on the seat left side, extends in the seat downward direction, and is wound about the non-illustrated spool of the retractor 28. For this reason, the webbing 38 is routed in a substantially U-shape whose seat lower side is open as seen in a seat front view. Furthermore, predetermined tension is applied to the webbing 38 by the retractor 28, so a state in which the webbing 38 is stretched between the belt anchor 26 and the retractor 28 is maintained. Because of this, a middle section 38C of the webbing 38 positioned above a head H of the occupant D is stretched between the pair of belt guides 34 and does not sag in the seat downward direction.

As shown in FIG. 3, the retractor 28, the first actuators 33, and the second actuators 25 are electrically connected to the ECU 30. Furthermore, the ECU 30 is electrically connected to various sensors—such as a seat occupancy sensor, which is disposed at the seat 14 and detects that the occupant D is seated, and a crash sensor and a crash prediction sensor, which detect or predict a crash of the vehicle. Moreover, the ECU 30 is electrically connected to an inflator 40 configuring the airbag device 13 (see FIG. 8). Details about the airbag 13 will be described later.

Here, in a state before the occupant D is seated in the seat 14, the ECU 30 is configured to control the first actuators 33 disposed at the rotating shafts 32 of the arm rests 22 to thereby hold the pair of arm rests 22 in the storage position. Furthermore, the ECU 30 controls the second actuators 25 disposed at the slide members 24 to thereby slide the slide members 24 in the seat upward direction so that the distal end portions 24A of the slide members 24 are held in a state in which they are positioned further in the seat upward direction than the head rest 20.

Next, when the occupant D is seated in the seat 14, the ECU 30 detects that the occupant D is seated in the seat 14 on the basis of a signal from the non-illustrated seat occupancy sensor. Additionally, as shown in FIG. 4, the first actuators 33 rotate the rotating shafts 32 on the basis of a signal from the ECU 30 to thereby rotate the arm rests 22 in the seat forward direction to the use position (see arrow A1 in FIG. 4). At this time, the middle section 38C of the webbing 38 that had been positioned above the head H of the occupant D passes above the head H of the occupant D and moves in the seat forward direction, so the middle section 38C does not get in the way of the head H of the occupant D.

Figure 5:
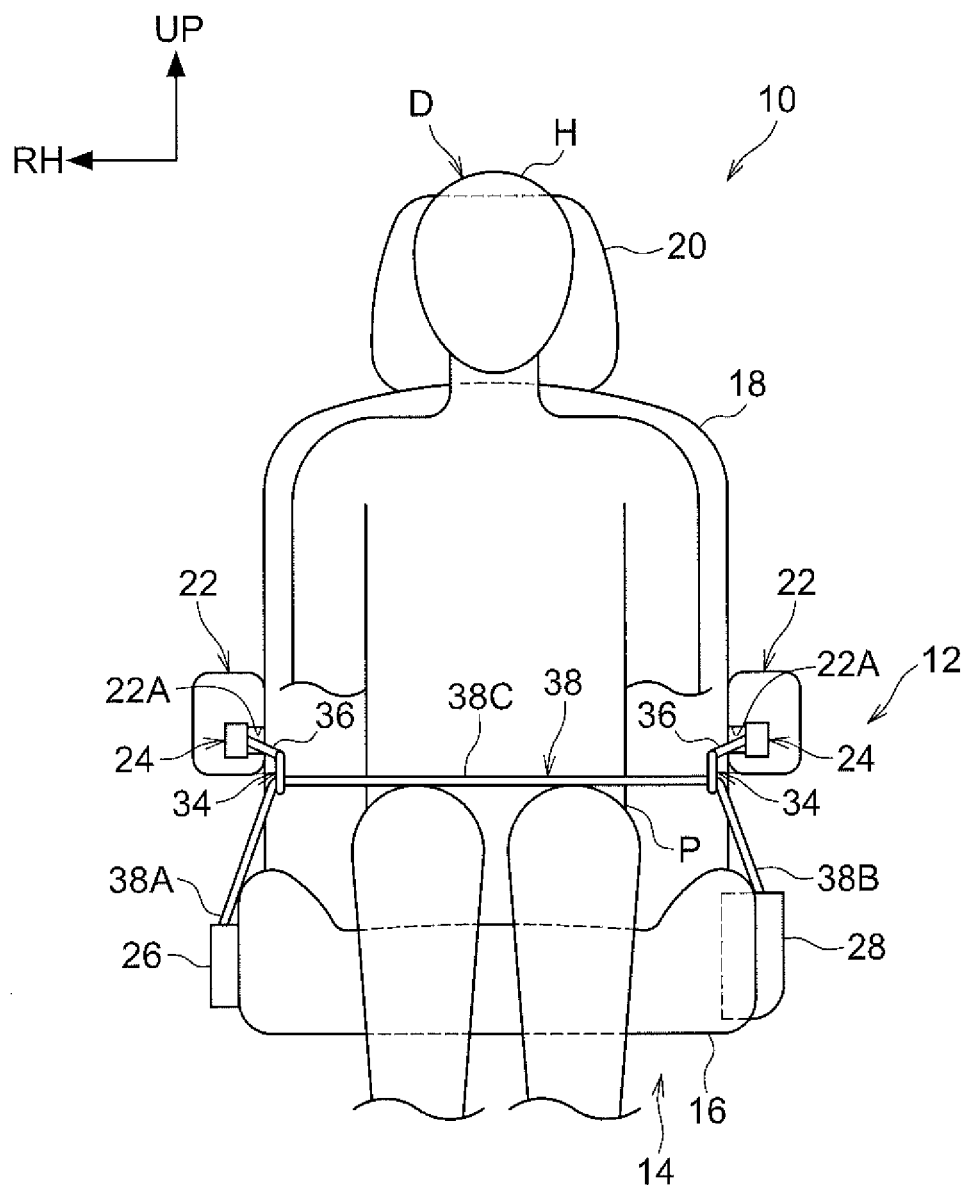
FIG. 5 is a front view, corresponding to FIG. 2, showing the vehicle seat in a state in which the seat belt is engaged.

As shown in FIG. 5, when the arm rests 22 are rotated to the use position, the middle section 38C of the webbing 38 becomes stretched in the seat width direction at the height of a pelvis P of the occupant D. Furthermore, as shown in FIG. 4, the second actuators 25 slide the slide members 24 toward the base sides of the arm rests 22 (the seat rearward direction in FIG. 4) on the basis of a signal from the ECU 30 (see arrow B1 in FIG. 4). Because of this, the slide members 24 become stored in the arm rests 22 and the belt guides 34 move closer toward the occupant D side. It should be noted that the second actuators 25 may be driven while the arm rests 22 are rotating to the use position, or the second actuators 25 may be driven after the aim rests 22 have been rotated to the use position. In a case where the second actuators 25 are driven while the arm rests 22 are rotating to the use position, the second actuators 25 are driven after the middle section 38C of the webbing 38 has passed above the head H of the occupant D, so that the middle section 38C can be kept from getting in the way of the head H of the occupant D.

After the first actuators 33 and the second actuators 25 have been driven, the ECU 30 sends a signal to the retractor 28 to drive the motor of the non-illustrated spool and take up a predetermined amount of the webbing 38. Because of this, the excess length of the webbing 38 becomes taken up. At this time, in the present embodiment, the middle section 38C of the webbing 38 is slightly away from the pelvis P or the thighs of the occupant D so as to not impart a sense of pressure to the occupant D. It should be noted that the webbing 38 may also be taken up by the retractor 28 at the same time that the second actuators 25 are driven.

In the way described above, a so-called two-point seat belt is automatically engaged. In a case where the ignition switch has been switched off or when a signal for canceling the engaged state of the seat belt is input to the ECU 30 as a result of the occupant D operating a button or the like, the second actuators 25 slide the slide members 24 toward the distal end sides of the aim rests 22 (the seat forward direction in FIG. 4) on the basis of a signal from the ECU 30. Furthermore, at the same time that the second actuators 25 are driven, or after the second actuators 25 have been driven, the first actuators 33 are driven on the basis of a signal from the ECU 30. Because of this, the arm rests 22 are rotated in the seat rearward direction to the storage position. It should be noted that in a case where the first actuators 33 and the second actuators 25 are simultaneously driven, the second actuators 25 are controlled in such a way as to slide the slide members 24 toward the distal end sides of the arm rests 22 early so that the middle section 38C of the webbing 38 does not get in the way of the head H of the occupant D.

Figure 6:
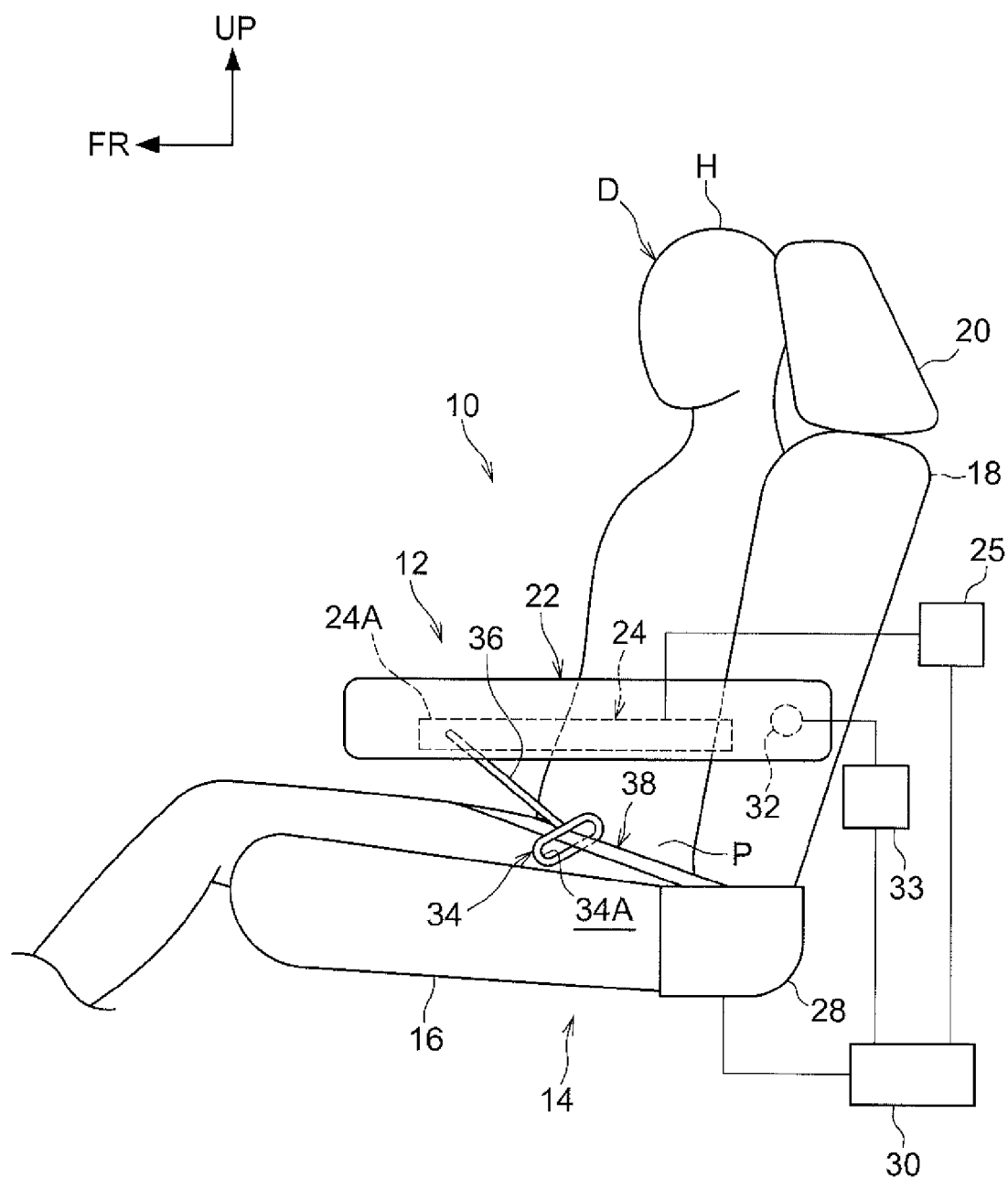
FIG. 6 is a side view showing the vehicle seat in a state in which webbing has been taken up in a retractor from the state shown in FIG. 4.
Figure 7:
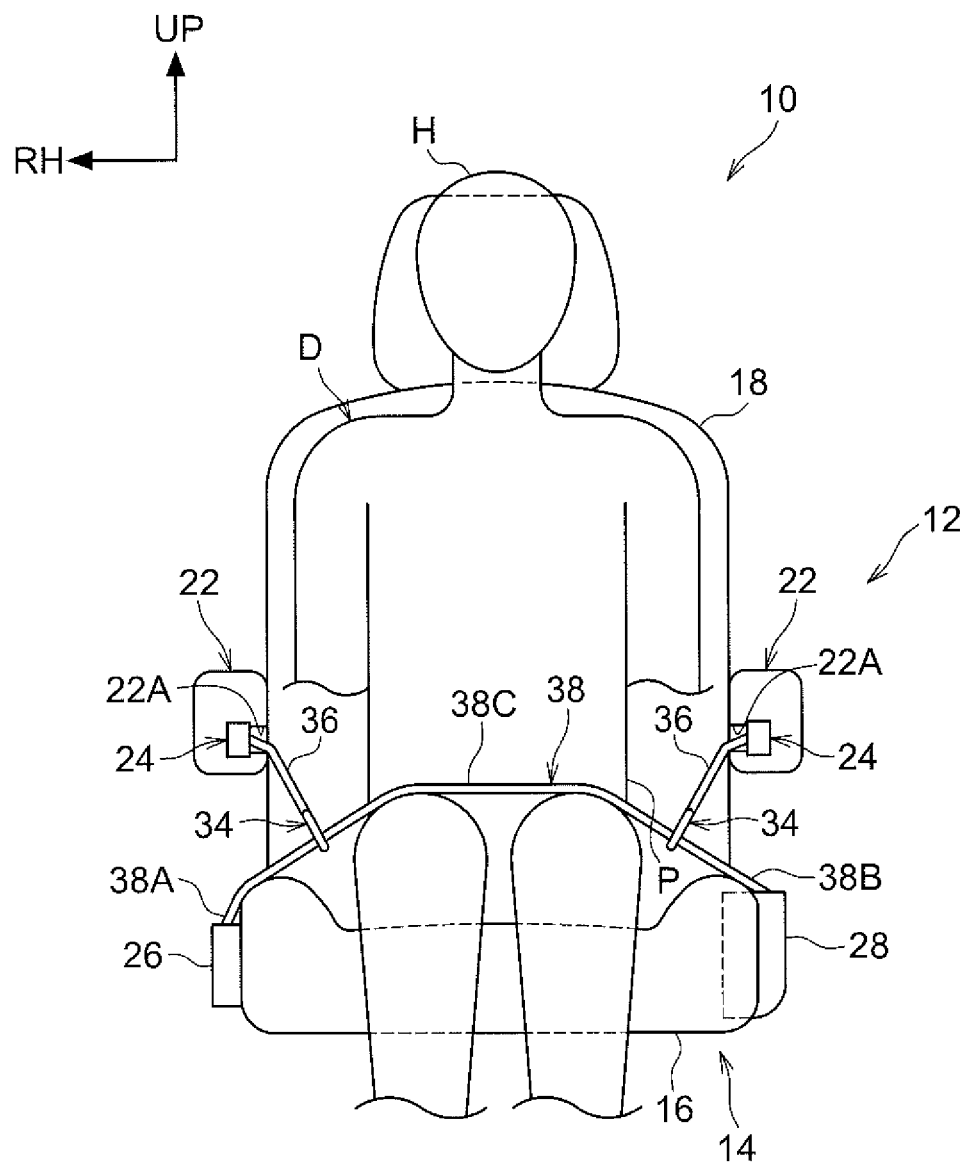
FIG. 7 is a front view showing the vehicle seat in a state in which the webbing has been taken up in the retractor from the state shown in FIG. 4.

Furthermore, the retractor 28 configuring the vehicle seat belt device 12 of the present embodiment is a so-called pre-crash seat belt which, when a crash of the vehicle has been predicted, takes up a predetermined amount of the webbing 38 to restrain the lower body of the occupant D. That is, in a case where a crash of the vehicle has been predicted on the basis of a signal from the non-illustrated crash prediction sensor in the state shown in FIG. 4, the ECU 30 drives the motor of the non-illustrated spool of the retractor 28 to take up a predetermined amount of the webbing 38. Because of this, as shown in FIG. 6 and FIG. 7, the elastic cords 36 extend and the belt guides 34 are moved toward the retractor 28 side. Additionally, the webbing 38 fits the occupant D and restrains the lower body of the occupant D. Moreover, the retractor 28 of the present embodiment is equipped with a pretensioner mechanism, and at the time of a crash of the vehicle the pretensioner mechanism forcibly takes up the webbing 38 to enhance the restraining force.

(Configuration of Airbag Device)

Figure 8:
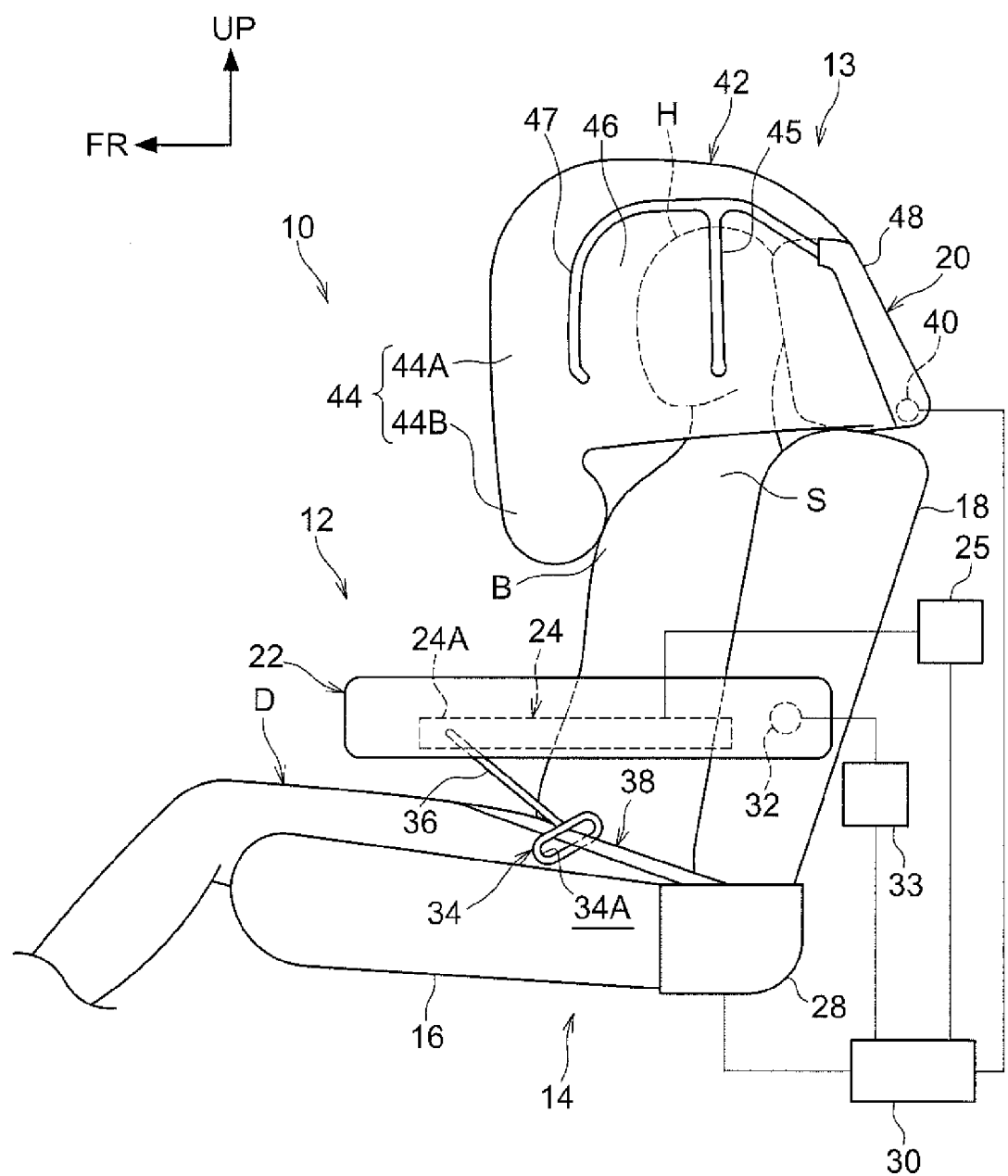
FIG. 8 is a side view showing the vehicle seat in a state in which a multidirectional airbag has been inflated and deployed from the state shown in FIG. 6.

Next, the airbag device 13 configuring the occupant protection system 10 of the present embodiment will be described. As shown in FIG. 8, the airbag device 13 is configured to include a multidirectional airbag 42 serving as an airbag, the inflator 40, and a module case (also called an airbag case) 48 configuring the head rest 20.

The multidirectional airbag 42 is folded up in a state in which the inflator 40 is connected thereto in such a way that it can supply gas, and the multidirectional airbag 42 is stored in the module case 48. Furthermore, the multidirectional airbag 42 is configured as a single bag that becomes inflated and deployed in such a way as to cover the head H of the occupant D from the seat front side and both seat right and left sides. More specifically, the multidirectional airbag 42 is configured to include a forwardly deploying portion 44, which becomes deployed in the seat forward direction relative to the head H, and a pair of laterally deploying portions 46, which become deployed in the seat sideward directions relative to the head H.

The forwardly deploying portion 44 is configured to include a first inflating portion 44A, which becomes inflated on the seat front side of the head rest 20, and a second inflating portion 44B, which serves as an upper body restraining portion positioned below the first inflating portion 44A. Here, the second inflating portion 44B is supplied with gas through the first inflating portion 44A and becomes inflated and deployed in front of a breast B and shoulders S of the occupant D. Additionally, the second inflating portion 44B restrains at least one of the breast B and the shoulders S of the occupant D.

The laterally deploying portions 46 are supplied with gas and become inflated and deployed on both sides of the head H. Furthermore, the laterally deploying portions 46 are partitioned in the seat front and rear direction by seam portions 45 that are non-inflating portions extending along the up and down direction. Moreover, the laterally inflating portions 46 have a size (area) such that they overlie the entire head H as seen in a side view, and the seam portions 45 partition, at the sections of the laterally inflating portions 46 that overlie the head H, the laterally inflating portions 46 into front and rear portions.

The front ends of the right and left laterally inflating portions 46 are connected in a communicated state to the forwardly inflating portion 44 and are supplied with gas from the inflator 40 via the forwardly inflating portion 44. The space between the first inflating portion 44A of the forwardly inflating portion 44 and the laterally inflating portions 46 are partitioned by a seam portion 47 that is a non-inflating portion.

As the inflator 40, a combustible type or cold gas type inflator is employed, and the inflator 40 supplies to the multidirectional airbag 42 the gas that is generated as a result of the inflator 40 being activated. In this embodiment, the inflator 40 is a cylinder type inflator and is placed in such a way that its lengthwise direction coincides with the seat width direction in the module ease 48. Furthermore, the inflator 40 is electrically connected to the ECU 30 and is activated by the ECU 30 at the time of a crash of the vehicle.

The module case 48 configures part of the head rest 20 and covers from behind the body section of the head rest 20. Additionally, a space for storing the multidirectional airbag 42 is disposed between the module case 48 and the body section of the head rest 20. Furthermore, the space between the module case 48 and the body section of the head rest 20 is closed off by a non-illustrated airbag door. The airbag door is configured to be ruptured at a tear line, which is a weak portion, by the deployment pressure of the multidirectional airbag 42. It should be noted that, for convenience of description, the module case 48 is not depicted on the head rest 20 shown in FIG. 1 to FIG. 7, but like in FIG. 8 the module case 48 is disposed on the head rest 20 shown in FIG. 1 to FIG. 7.

(Action and Effects)

Next, action and effects of the vehicle seat belt device 12 pertaining to the present embodiment and the occupant protection system 10 equipped with the vehicle seat belt device 12 will be described.

In the vehicle seat belt device 12 pertaining to the present embodiment, when the occupant D is seated the first actuators 33 are driven by the ECU 30 so that the arm rests 22 are rotated in the seat forward direction to the use position. Furthermore, the second actuators 25 are driven by the ECU 30 so that the slide members 24 are slid toward the base sides of the arm rests 22. Moreover, the motor that rotates the spool of the retractor 28 is driven by the ECU 30 so that the excess length of the webbing 38 is taken up.

Furthermore, in a case where the ignition switch has been switched off or when the occupant D operates a button or the like, the arm rests 22, the slide members 24, and the retractor 28 are controlled in an opposite process of that at the time of seat belt engagement, so that the engaged state of the two-point seat belt can be automatically canceled. In the way described above, the two-point seat belt can be automatically engaged and disengaged.

Furthermore, in the present embodiment, the webbing 38 is passed through the belt guides 34 and bridges the belt anchor 26 and the retractor 28 disposed on the seat 14, and by rotating the arm rests 22 the two-point seat belt becomes engaged and disengaged. Because of this, the two-point seat belt can be automatically engaged and disengaged regardless of the facing direction of the seat 14 and the position of the seat 14. That is, in a configuration where the seat belt device is disposed on the vehicle body, such as on the roof, sometimes the seat belt cannot be properly engaged in cases where the facing direction of the seat 14 has changed or the seat 14 has moved in the vehicle front and rear direction or in the vehicle width direction. In contrast to this, in the present embodiment, the webbing 38 is routed independently of the vehicle body, so the two-point seat belt can be automatically engaged and disengaged regardless of the facing direction of the seat 14 and the position of the seat 14.

Moreover, in the present embodiment, the belt guides 34 and the slide members 24 are coupled to each other by the extendable and contractible elastic cords 36. Because of this, by taking up a predetermined amount of the webbing 38 with the retractor 28 at the time of seat belt engagement and at the time a crash is predicted, the elastic cords 36 become extended so that the belt guides 34 can be moved toward the belt anchor 26 side and the retractor 28 side. As a result, the webbing 38 is pulled closer toward the occupant D side so that the webbing 38 can be made to fit the occupant D regardless of the build and the seated posture of the occupant D. That is, the restraining performance of the seat belt can be improved regardless of the build and the seated posture of the occupant D.

Particularly in the present embodiment, by causing a predetermined amount of the webbing 38 to be taken up by the retractor 28 at the time a crash of the vehicle is predicted, the force with which the occupant D is restrained can be enhanced. Because of this, the ability to initially restrain the occupant D can be improved.

Moreover, as shown in FIG. 8, the occupant protection system 10 of the present embodiment is disposed with the airbag device 13 equipped with the multidirectional airbag 42, and the multidirectional airbag 42 is a single bag that deploys in the seat forward direction and the seat sideward directions relative to the head H of the occupant D and covers the head H of the occupant D. Furthermore, the second inflating portion 44B that restrains at least one of the breast B and the shoulders S of the occupant D is disposed at the forwardly deploying portion 44 configuring the multidirectional airbag 42. Because of this, at the time of a crash of the vehicle, the multidirectional airbag 42 becomes inflated and deployed so that the upper body of the occupant D is restrained, and the lower body of the occupant D is restrained by the webbing 38. As a result, the upper body and the lower body of the occupant D can be restrained at the time of a crash of the vehicle regardless of the position of the seat 14 and the facing direction of the seat 14.

Although in the present embodiment the rotating shafts 32 of the aim rests 22 are rotated as a result of the first actuators 33 being driven and the slide members 24 are slid as a result of the second actuators 25 being driven, other configurations are possible. For example, an arm rest 50 of a first example modification shown in FIG. 9 and an arm rest 60 of a second example modification shown in FIG. 10 may be employed.

(First Example Modification)

Figure 9:
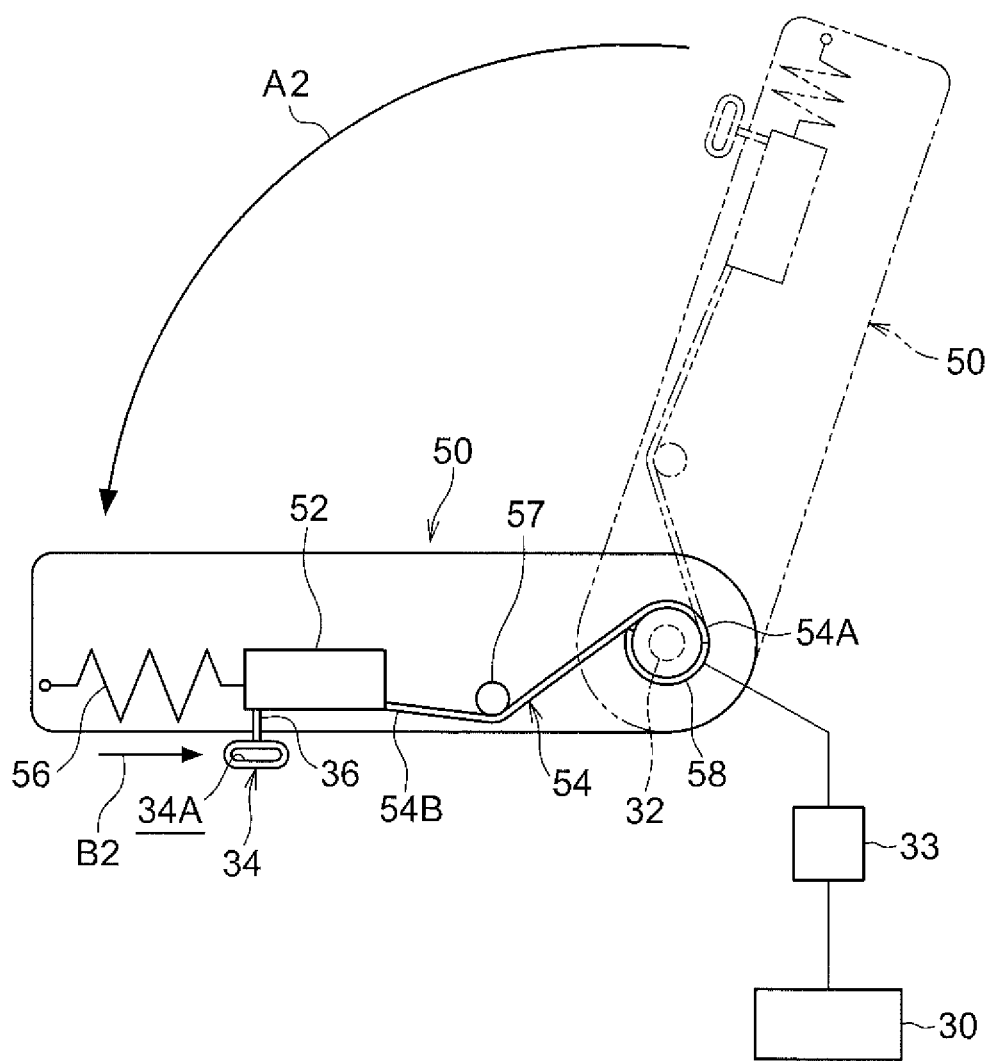
FIG. 9 is a schematic enlarged side view schematically showing a first example modification of an arm rest configuring the vehicle seat belt device pertaining to the first embodiment.

As shown in FIG. 9, inside the arm rest 50 pertaining to the present example modification, there are mainly disposed a slide member 52, a wire 54, a guide roller 57, and a tension spring 56. It should be noted that in FIG. 9, for convenience of description, the parts placed inside the arm rest 50 are depicted with solid lines. The same is also true of FIG. 10.

The slide member 52 is disposed inside the arm rest 50 and is slidable along the arm rest 50. Furthermore, the belt guide 34 is coupled to the arm rest 50 via the elastic cord 36.

The wire 54 is stretched between the slide member 52 and the rotating shaft 32 of the arm rest 50. Specifically, one end portion 54A of the wire 54 is wound about a periphery of a stationary portion 58 attached to the end portion of the rotating shaft 32 of the arm rest 50. Furthermore, the other end portion 54B of the wire 54 is secured to the end portion of the slide member 52 on the base side of the arm rest 50. Moreover, the guide roller 57 is placed between the slide member 52 and the stationary portion 58, and the middle section of the wire 54 between the one end portion 54A and the other end portion 54B is entrained about the guide roller 57.

Here, the stationary portion 58 is attached to the rotating shaft 32 via a non-illustrated bearing or the like, so the stationary portion 58 is configured to not rotate even when the rotating shaft 32 rotates. For this reason, as the arm rest 50 is rotated from the storage position represented by the long dashed double-short dashed line in FIG. 9 to the use position represented by the solid line in FIG. 9, the one end portion 54A of the wire 54 is taken up on the periphery of the stationary portion 58.

The tension spring 56 is attached to the end portion of the slide member 52 on the distal end side of the arm rest 50. The tension spring 56 couples the slide member 52 and the inner wall of the arm rest 50 to each other, and the slide member 52 is urged by the tensile force of the tension spring 56 toward the distal end side of the arm rest 50 (the opposite side of the direction heading toward the rotating shaft 32).

In the arm rest 50 of the first example modification described above, when the first actuator 33 is driven on the basis of a signal from the ECU 30, the arm rest 50 is rotated from the storage position to the use position (see arrow A2 in FIG. 9). As a result of the arm rest 50 being rotated, the one end portion 54A of the wire 54 becomes taken up on the periphery of the stationary portion 58 and the slide member 52 becomes pulled toward the rotating shaft 32 side (see arrow B2 in FIG. 9). Because of this, the slide member 52 is slid toward the base side of the arm rest 50 counter to the urging force of the tension spring 56. In this way, by simply rotating the arm rest 50 from the storage position to the use position, the belt guide 34 can be slid toward the base side of the arm rest 50 via the slide member 52.

Furthermore, conversely, in a case where the arm rest 50 has been returned from the use position to the storage position, the one end portion 54A of the wire 54 wound about the periphery of the stationary portion 58 is unwound. Additionally, the slide member 52 is slid by the urging force of the tension spring 56 toward the distal end side of the arm rest 50. That is, the belt guide 34 can be slid in accordance with the rotational motion of the arm rest 50 without having to provide the second actuator 25 for sliding the belt guide 34.

(Second Example Modification)

Figure 10:
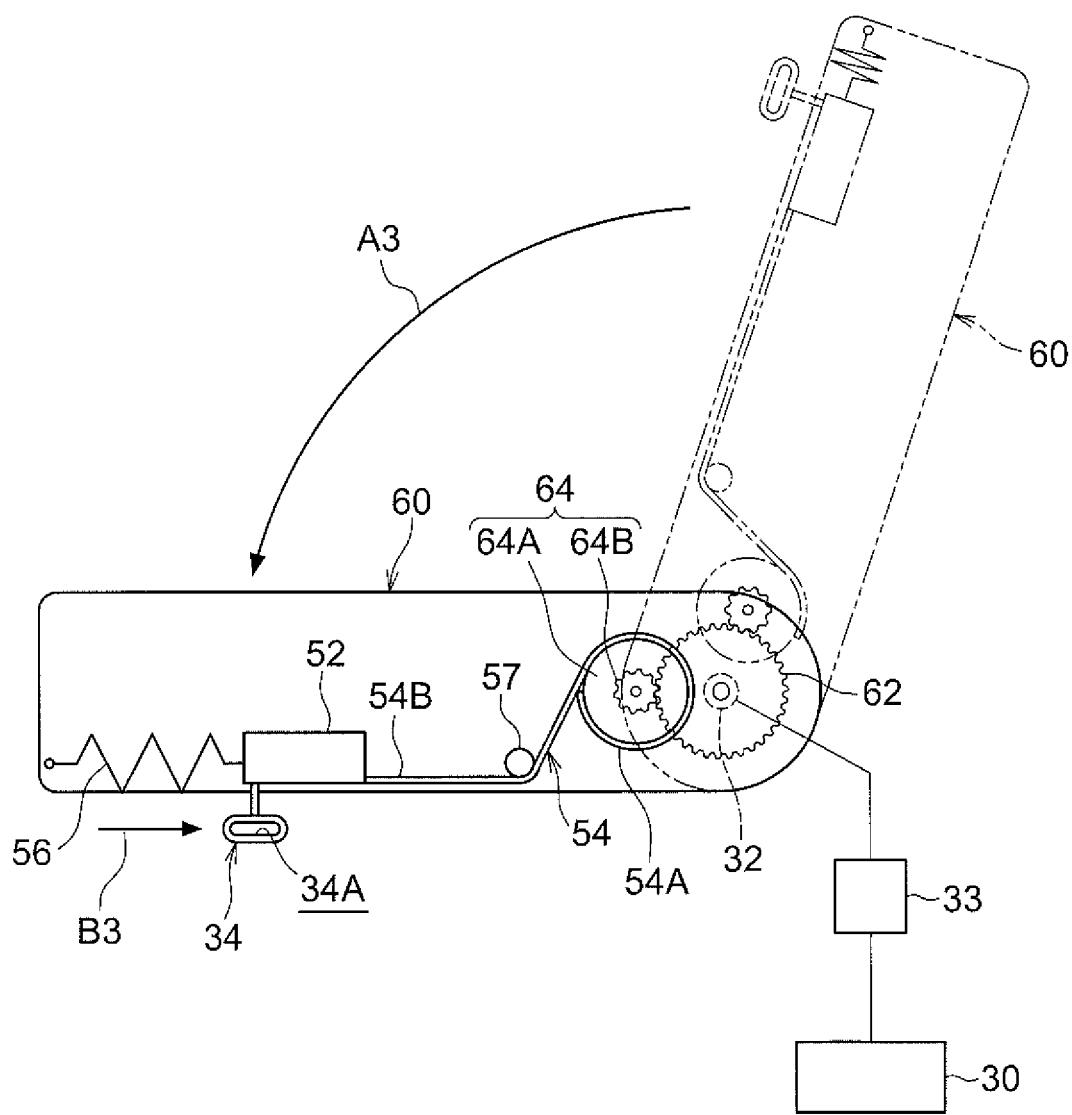
FIG. 10 is a schematic enlarged side view schematically showing a second example modification of an arm rest configuring the vehicle seat belt device pertaining to the first embodiment.

Next, the second example modification will be described. As shown in FIG. 10, inside the arm rest 60 pertaining to the present example modification, there is disposed a first gear 62 attached to the rotating shaft 32 of the arm rest 60. The first gear 62 is rotated together with the rotating shaft 32.

A second gear 64B configuring a pulley 64 meshes with the first gear 62. The pulley 64 is configured to include a pulley body 64A, which is substantially disc-shaped, and the second gear 64B, which is integrally formed on one surface of the pulley body 64A. Furthermore, the second gear 64B is formed in a smaller diameter than the pulley body 64A and is formed with a fewer number of teeth than the first gear 62. For this reason, the second gear 64B rotates more than the first gear 62 when the first gear 62 is rotated.

The one end portion 54A of the wire 54 is wound about and secured to the pulley body 64A. The other end portion 54B of the wire 54 is secured to the end portion of the slide member 52 on the base side of the arm rest 60.

In the arm rest 60 of the second example modification described above, when the first actuator 33 is driven on the basis of a signal from the ECU 30, the arm rest 60 is rotated from the storage position to the use position (see arrow A3 in FIG. 10). As a result of the arm rest 60 being rotated, the one end portion 54A of the wire 54 is taken up on the pulley 64 and the slide member 52 is pulled toward the rotating shaft 32 side (see arrow B3 in FIG. 10). Because of this, the slide member 52 is slid toward the base side of the arm rest 60 counter to the urging force of the tension spring 56. In this way, by simply rotating the arm rest 60 from the storage position to the use position, the belt guide 34 can be slid toward the base side of the arm rest 60 via the slide member 52.

Furthermore, by causing the first gear 62 and the second gear 64B to mesh with each other and using the second gear 64B that has a fewer number of teeth than the first gear 62, the slide member 52 can be slid further toward the base side of the arm rest 60 compared to the first example modification.

It should be noted that although in the arm rest 50 and the arm rest 60 the slide member 52 is urged by the tension spring 56 toward the opposite side of the direction heading toward the rotating shaft 32, the example modifications are not limited to this and another spring may also be used. For example, a compression spring may be placed between the slide member 52 and the inner wall of the arm rest on the rotating shaft 32 side, so that the slide member 52 is urged by the compression spring toward the opposite side of the direction heading toward the rotating shaft 32 (that is, urged away from the rotating shaft 32).

Second Embodiment

Next, an occupant protection system 70 equipped with a vehicle seat belt device 71 pertaining to a second embodiment will be described with reference to FIG. 11 to FIG. 16. In the present embodiment, the occupant protection system 70 has a configuration that automatically engages a so-called three-point seat belt. It should be noted that, regarding configurations that are the same as those in the first embodiment, the same reference signs are assigned thereto and description thereof will be appropriately omitted. Furthermore, an airbag device configuring the occupant protection system 70 of the present embodiment is the same as the airbag device 13 of the first embodiment shown in FIG. 8, so illustration and description thereof will be omitted, and here only the vehicle seat belt device 71 will be described.

Figure 11:
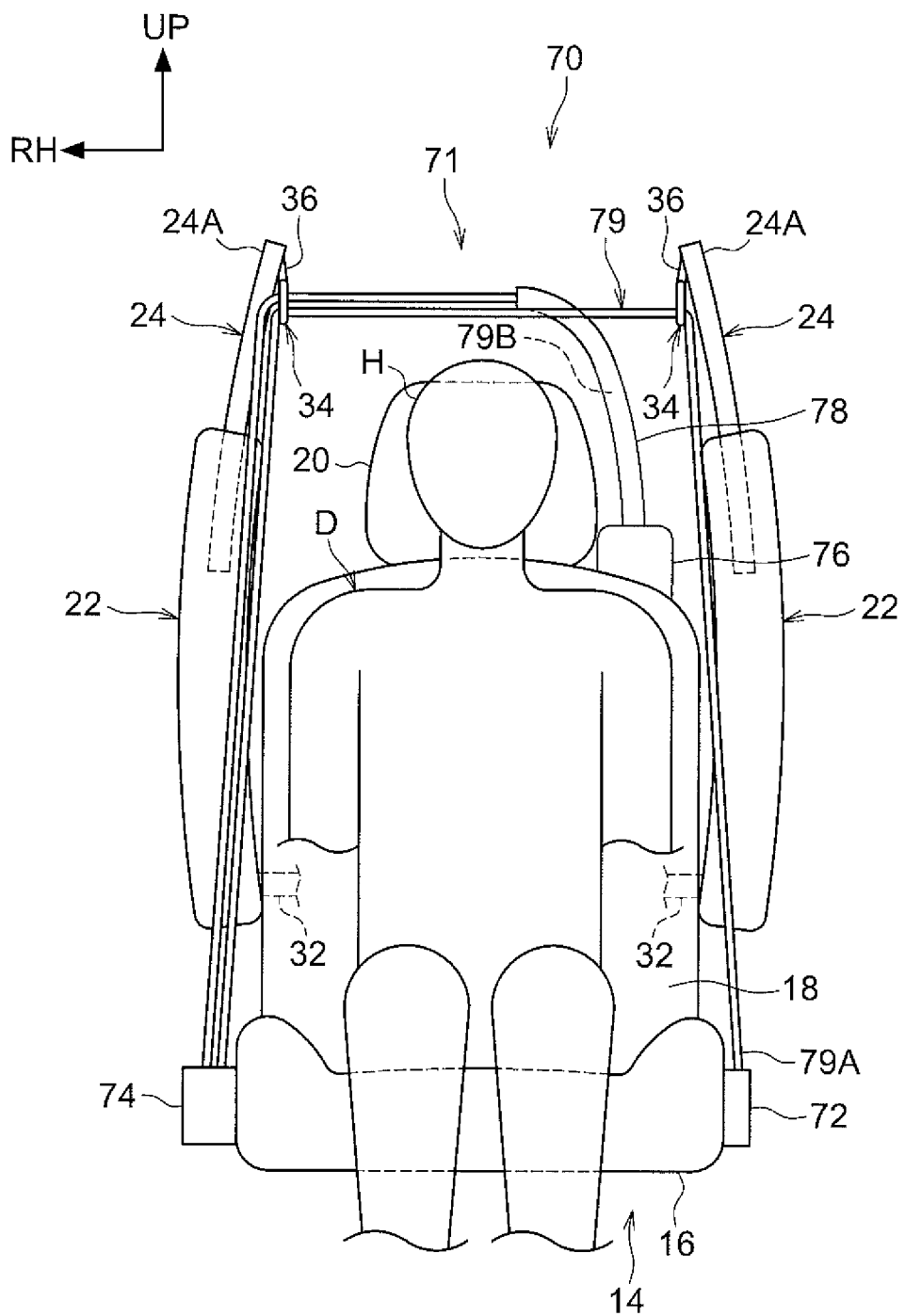
FIG. 11 is a front view, seen from the seat front side, of the vehicle seat to which an occupant protection system pertaining to a second embodiment has been applied, and is a view showing a state before seat belt engagement.

As shown in FIG. 11, in the vehicle seat belt device 71 configuring the occupant protection system 70 of the present embodiment, a first belt anchor 72 is disposed on the lower portion of the seat left side (one seat width direction side) of the seat back 18. The first belt anchor 72 is disposed at the section where the seat cushion 16 and the seat back 18 are coupled to each other, and one end portion 79A of webbing 79 is anchored to the first belt anchor 72.

A second belt anchor 74 is disposed on the lower portion of the seat right side (the other seat width direction side) of the seat back 18. A non-illustrated catch portion is disposed at the second belt anchor 74, and the webbing 79 is looped back on the catch portion. Specifically, in a state in which the arm rests 22 are held in the storage position, the webbing 79 extends in the seat upward direction from the first belt anchor 72, passes through the belt guide 34 on the seat left side, and extends toward the seat right side. Furthermore, the webbing 79 passes through the belt guide 34 on the seat right side, extends in the seat downward direction, and is looped back in the second belt anchor 74.

The webbing 79 looped back in the second belt anchor 74 extends in the seat upward direction, is again passed through the belt guide 34 on the seat right side, and extends toward the seat left side. Additionally, the other end side 79B of the webbing 79 passed through the belt guide 34 on the seat right side is inserted into a soft boot 78, which serves as a tubular member, and is taken up in a retractor 76. Here, the retractor 76 of the present embodiment is disposed on the seat left side (the one seat width direction side) of the upper end portion of the seat back 18, and a non-illustrated spool is disposed inside the retractor 76. Additionally, the other end side 79B of the webbing 79 is wound about the spool. Furthermore, the soft boot 78 is disposed further on one seat width direction end side than the head rest 20 and extends further in the seat upward direction than the head rest 20 along the side portion of the head rest 20 from the retractor 76 in a state in which the arm rests 22 are held in the storage position. Moreover, the upper end portion of the soft boot 78 is curved toward the seat right side.

Here, predetermined tension is applied to the webbing 79 by the retractor 76, so that the webbing 79 does not sag. Furthermore, the other end side 79B of the webbing 79 is inserted into the soft boot 78, and the other end side 79B of the webbing 79 is kept by the soft boot 78 from getting in the way of the head rest 20.

Figure 12:
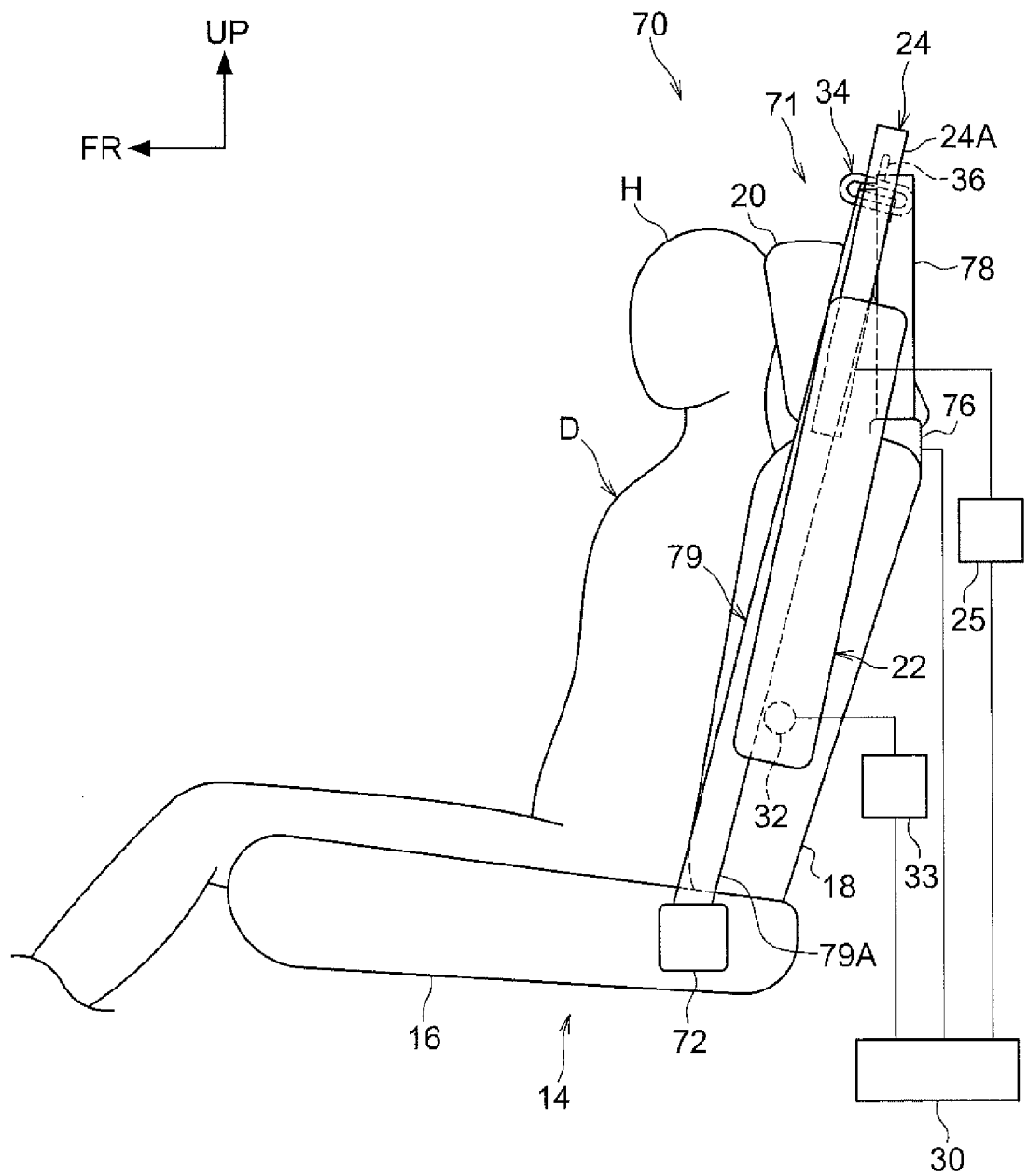
FIG. 12 is a side view, seen from outside in the seat width direction, of the vehicle seat to which the occupant protection system pertaining to the second embodiment has been applied, and is view showing a state before seat belt engagement.

As shown in FIG. 12, the retractor 76, the first actuators 33, and the second actuators 25 are electrically connected to the ECU 30. Furthermore, the ECU 30 is electrically connected to various sensors—such as a seat occupancy sensor, which is disposed at the seat 14 and detects that the occupant D is seated, and a crash sensor and a crash prediction sensor, which detect or predict a crash of the vehicle. Moreover, the ECU 30 is electrically connected to the inflator of the airbag device (see FIG. 8).

In a state before the occupant D is seated in the seat 14, the ECU 30 is configured to control the first actuators 33 disposed at the rotating shafts 32 of the arm rests 22 to thereby hold the pair of arm rests 22 in the storage position. Furthermore, the ECU 30 controls the second actuators 25 disposed at the slide members 24 to thereby slide the slide members 24 in the seat upward direction so that the distal end portions 24A of the slide members 24 are held in a state in which they are positioned further in the seat upward direction than the head rest 20.

Figure 13:
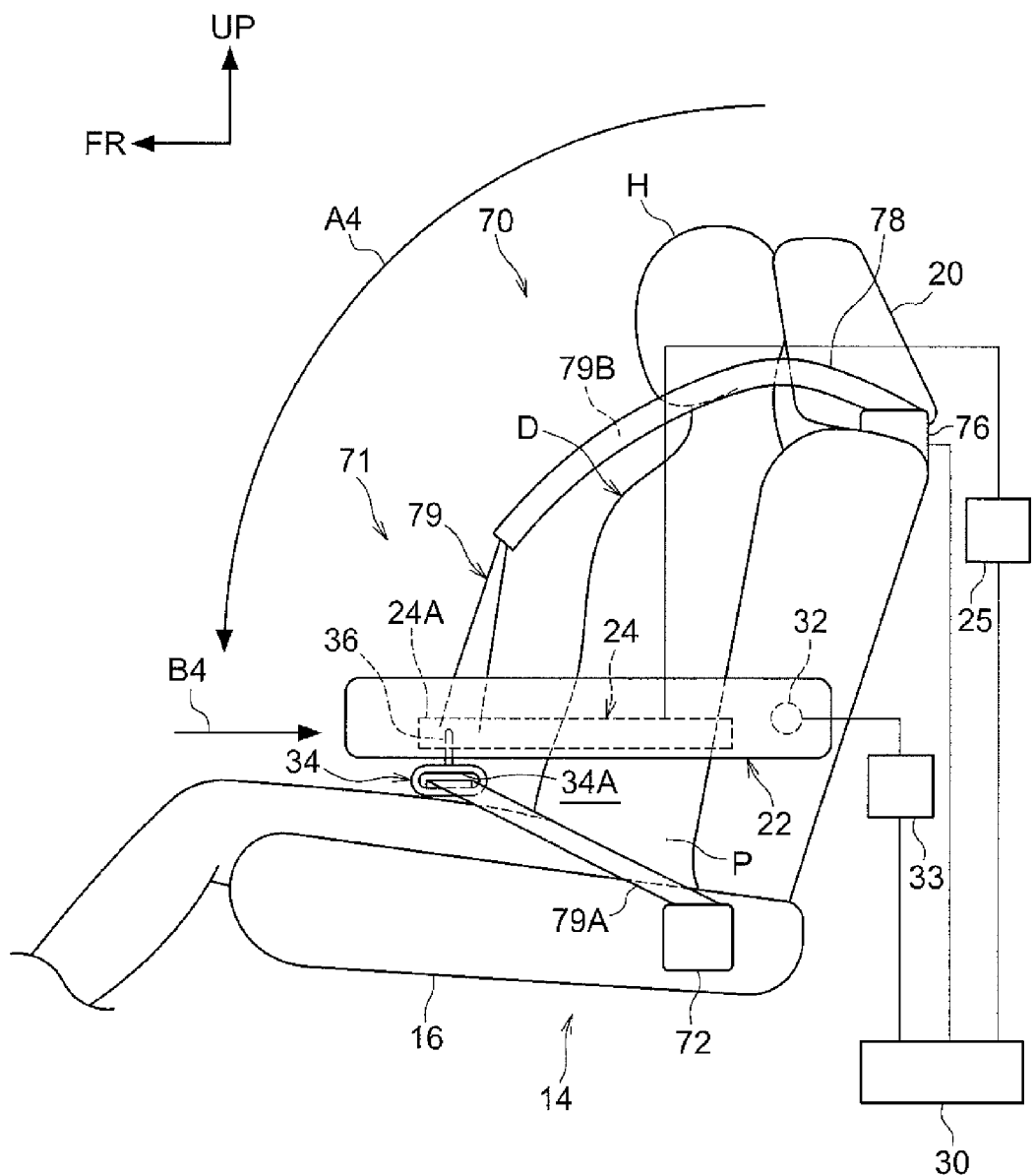
FIG. 13 is a side view, corresponding to FIG. 12, showing the vehicle seat in a state in which the seat belt is engaged.

Next, when the occupant D is seated in the seat 14, the ECU 30 detects that the occupant D is seated in the seat 14 on the basis of a signal from the non-illustrated seat occupancy sensor. Additionally, as shown in FIG. 13, the first actuators 33 rotate the rotating shafts 32 on the basis of a signal from the ECU 30 to thereby rotate the arm rests 22 in the seat forward direction to the use position (see arrow A4 in FIG. 13). At this time, the soft boot 78 bends in the seat forward direction, and the other end side 79B of the webbing 79 passes above the head H of the occupant D and moves in the seat forward direction.

Figure 14:
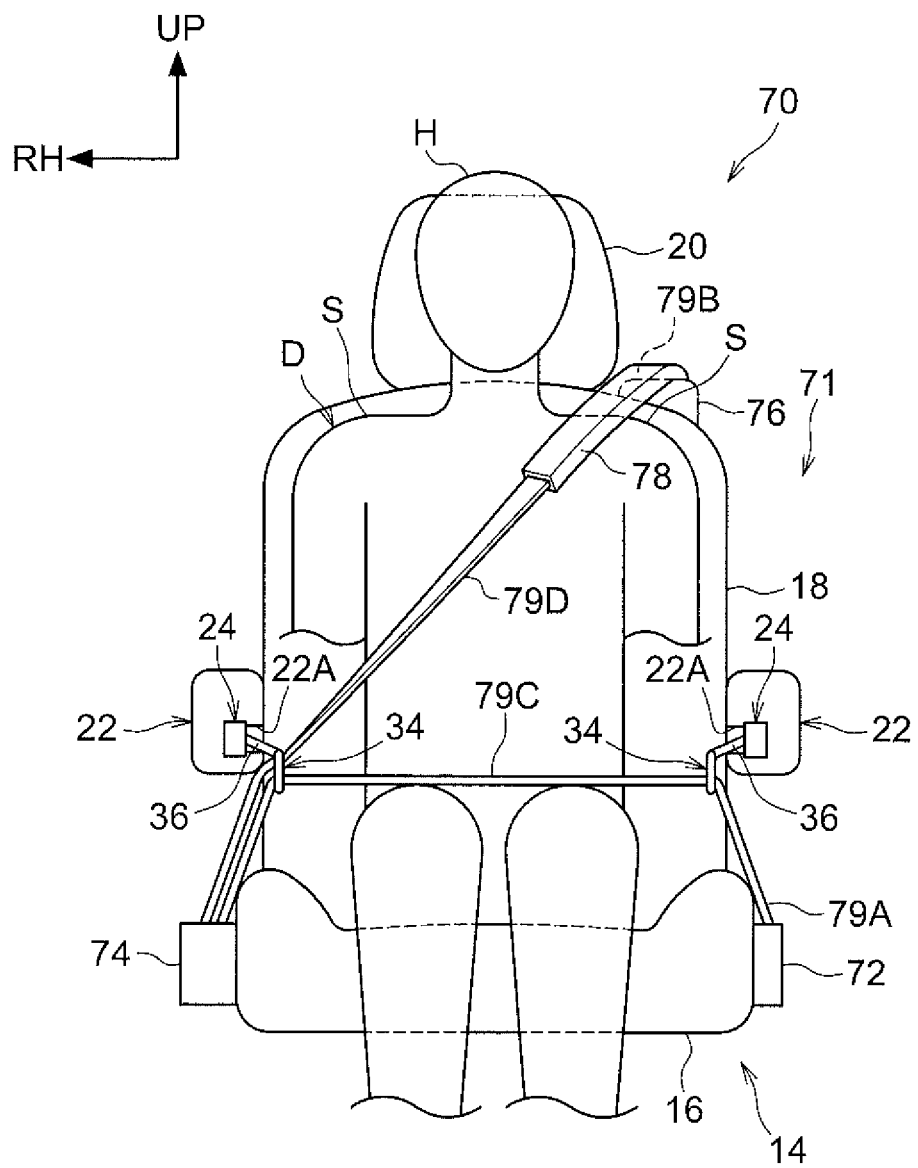
FIG. 14 is a front view, corresponding to FIG. 11, showing the vehicle seat in a state in which the seat belt is engaged.

When the arm rests 22 are rotated to the use position, the belt guides 34 become positioned at the height of the pelvis P of the occupant D. For this reason, as shown in FIG. 14, a section 79C of the webbing 79 between the pair of belt guides 34 becomes stretched in the seat width direction at the height of the pelvis P of the occupant D. Furthermore, as shown in FIG. 13, the ECU 30 sends a signal to the second actuators 25 to slide the slide members 24 toward the base sides of the arm rests 22 (in the seat rearward direction in FIG. 13) (see arrow B4 in FIG. 13). Because of this, the slide members 24 become stored in the arm rests 22 and the belt guides 34 move closer toward the occupant D side.

As shown in FIG. 14, a section 79D of the webbing 79 between the belt guide 34 on the seat right side and the retractor 76 is placed diagonally from the shoulder S of the occupant D.

After the first actuators 33 and the second actuators 25 have been driven, the ECU 30 sends a signal to the retractor 76 to drive the motor of the non-illustrated spool and take up a predetermined amount of the webbing 79. Because of this, the excess length of the webbing 79 becomes taken up, and the pelvis P of the occupant D becomes restrained by the section 79C of the webbing 79 between the first belt anchor 72 and the second belt anchor 74. That is, the section 79C becomes a lap belt.

Meanwhile, the upper body of the occupant D becomes restrained by the section 79D of the webbing 79 between the belt guide 34 on the seat right side and the retractor 76. That is, the section 79D becomes a shoulder belt. It should be noted that, in the present embodiment, the section 79C that becomes a lap belt is slightly away from the pelvis P or the thighs of the occupant D so as to not impart a sense of pressure to the occupant D.

In the way described above, the so-called three-point seat belt is automatically engaged. Furthermore, in a case where the ignition switch has been switched off or when a signal for canceling the engaged state of the seat belt is input to the ECU 30 as a result of the occupant D operating a button or the like, the second actuators 25 slide the slide members 24 toward the distal end sides of the arm rests 22 (the seat forward direction in FIG. 13) on the basis of a signal from the ECU 30. Furthermore, at the same time that the second actuators 25 are driven, or after the second actuators 25 have been driven, the first actuators 33 are driven on the basis of a signal from the ECU 30. Because of this, the arm rests 22 are rotated in the seat rearward direction to the storage position.

Figure 15:
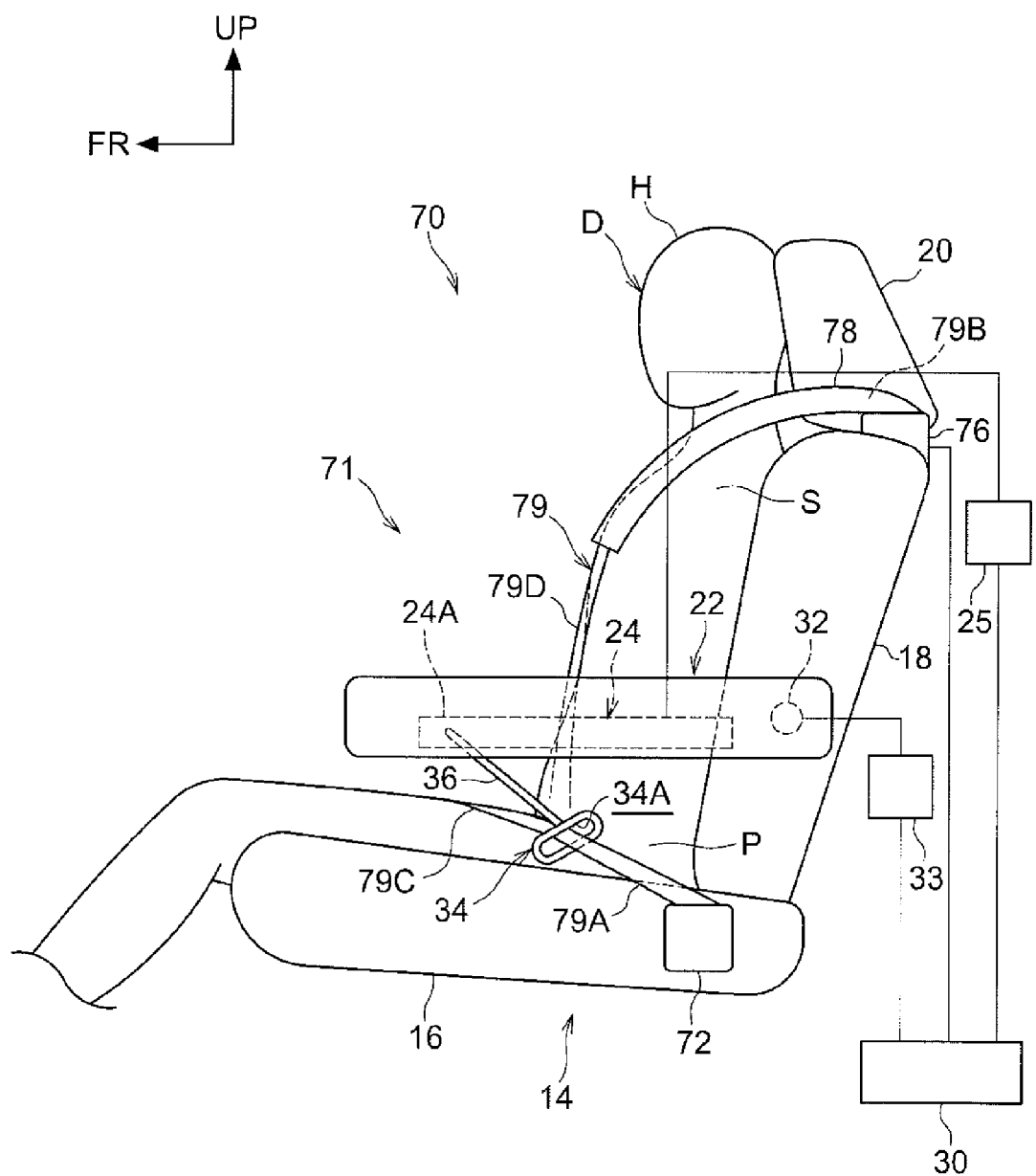
FIG. 15 is a side view showing the vehicle seat in a state in which webbing has been taken up in a retractor from the state shown in FIG. 13.
Figure 16:
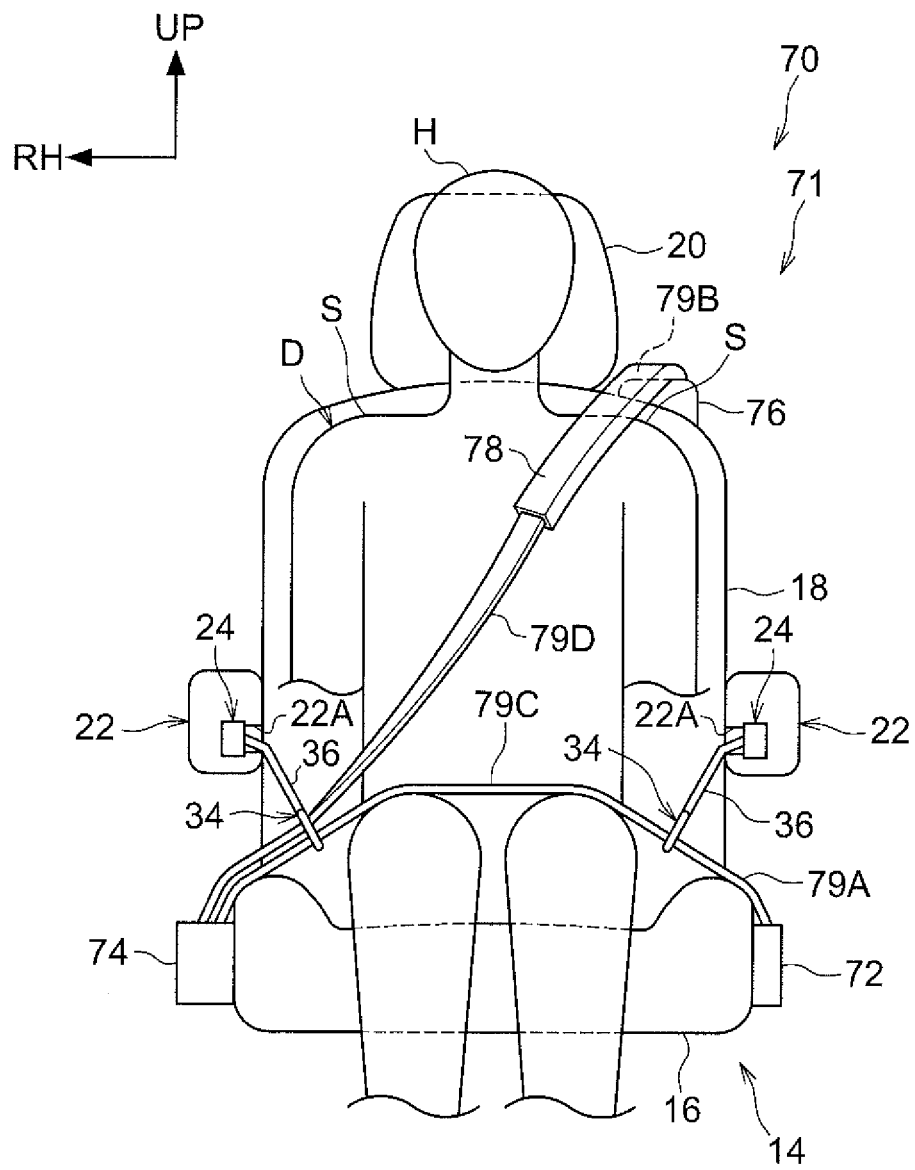
FIG. 16 is a front view showing the vehicle seat in a state in which the webbing has been taken up in the retractor from the state shown in FIG. 14.

Furthermore, the retractor 76 configuring the vehicle seat belt device 71 of the present embodiment is a so-called pre-crash seat belt which, when a crash of the vehicle has been predicted, takes up a predetermined amount of the webbing 79 to restrain the lower body of the occupant D. That is, in a case where a crash of the vehicle has been predicted on the basis of a signal from the non-illustrated crash prediction sensor in the state shown in FIG. 13, the ECU 30 drives the motor of the non-illustrated spool of the retractor 76 to take up a predetermined amount of the webbing 79. Because of this, as shown in FIG. 15 and FIG. 16, the elastic cords 36 extend and the belt guides 34 are moved toward the first belt anchor 72 side and the second belt anchor 74 side. Additionally, the webbing 79 fits the occupant D and restrains the occupant D. Moreover, the retractor 76 of the present embodiment is equipped with a pretensioner mechanism, and at the time of a crash of the vehicle the pretensioner mechanism forcibly takes up the webbing 79 to enhance the restraining force.

(Action and Effects)

Next, the action and effects of the vehicle seat belt device 71 pertaining to the present embodiment will be described.

In the vehicle seat belt device 71 pertaining to the present embodiment, when the occupant D is seated the three-point seat belt automatically becomes engaged. Because of this, the ability to restrain the upper body can be enhanced compared to a two-point seat belt.

Furthermore, in the present embodiment, the other end side 79B of the webbing 79 is inserted into the flexible soft boot 78, so the shape of the other end side 79B of the webbing 79 can be maintained in a state in which the arm rests 22 are held in the storage position. As a result, the other end side 79B of the webbing 79 can be kept from getting in the way of the head H and so forth of the occupant D. Furthermore, the other end side 79B of the webbing 79 can be kept from catching on the head rest 20 or the like when the arm rests 22 are rotated. Other action is the same as that of the first embodiment.

The first embodiment and the second embodiment have been described above, but the disclosure is not limited to these embodiments and can of course be implemented in other ways without departing from the spirit thereof. For example, in the above embodiments, the ECU 30 is configured to rotate the spool of the retractor and take up the other end portion of the webbing at a time a crash is predicted, but the ECU 30 is not limited to this. The ECU 30 may also take up the other end portion of the webbing to restrain the occupant D at the time of seat belt engagement.

Furthermore, in the above embodiments, the belt guides 34 and the slide members 24 are coupled to each other by the extendable and contractible elastic cords 36, but the disclosure is not limited to this. For example, extendable and contractible springs or the like may also be used to couple the belt guides 34 and the slide members 24 to each other. Moreover, in a case where the restraining performance can be met without having to pull the belt guides 34 closer toward the occupant D side, the belt guides 34 may also be directly attached to the slide members 24.

Furthermore, in the second embodiment, the other end side 79B of the webbing 79 is inserted into the soft boot 78, but the second embodiment is not limited to this and the other end side 79B of the webbing 79 may also be inserted into another tubular member that is flexible.

Moreover, in the above embodiments, the occupant protection systems are equipped with the airbag device 13 equipped with the multidirectional airbag 42, but the disclosure is not limited to this. For example, in a case where the upper body of the occupant D can be protected by an airbag device or the like installed in the vehicle body, the described seat belt device may also be applied to a vehicle seat not equipped with the airbag device 13.

Furthermore, in the above embodiments, the seat belt is engaged after the ECU 30 has detected that the occupant D is seated on the basis of a signal from the seat occupancy sensor, but the disclosure is not limited to this. For example, a configuration may be adopted where, after the occupant D is seated in the seat 14, the occupant D engages the seat belt by operating a button disposed on the seat 14 or the like.

Moreover, in the second embodiment, the retractor 76 is disposed on the seat left side (one seat width direction side) of the upper end portion of the seat back 18, but the second embodiment is not limited to this. For example, in FIG. 12, a belt guide may also be disposed instead of the retractor 76 on the seat left side of the upper end portion of the seat back 18. In this case, the second embodiment may be given a configuration where the retractor 76 is placed on the rear portion of the seat back 18 and where the webbing 79 passed through the belt guide on the upper end portion of the seat back 18 is taken up by the retractor 76.

What is claimed is:
1. A vehicle seat belt device comprising:
    a pair of arm rests that are disposed on first and second width direction sides of a seat back of a vehicle seat and that are rotatable between a storage position, in which the arm rests extend substantially vertically, and a use position, in which the arm rests are tilted in a seat forward direction from the storage position and extend substantially horizontally;
    slide members that are respectively disposed at the pair of arm rests and that are slidable along the arm rests, distal end portions of the slide members having belt guides through which webbing of a belt is passed;
    a belt anchor that is disposed on the first width direction side of a lower portion of the seat back, and to which a first end portion of the webbing is attached;
    a retractor that is disposed on the second width direction side of the lower portion of the seat back, and that takes up a second end portion of the webbing that has passed through the belt guides on both of the first and second width direction sides; and
    an electronic control unit that, (i) in a state before an occupant is seated in the vehicle seat, causes the pair of arm rests to be held in the storage position and causes the slide members to be held in a state in which the slide members have been moved further in a seat upward direction than a head rest of the vehicle seat, and that, (ii) in a state in which the occupant is seated, causes the pair of arm rests to rotate from the storage position to the use position, causes the slide members to slide toward base sides of the arm rests, and causes a predetermined amount of the webbing to be taken up by the retractor.

2. The vehicle seat belt device according to claim 1, further comprising extendable and contractible coupling members that couple the belt guides to the slide members.

3. The vehicle seat belt device according to claim 1, wherein the electronic control unit causes the predetermined amount of the webbing to be taken up by the retractor at a time of a crash of the vehicle or at a time at which a crash of the vehicle is predicted.

4. The vehicle seat belt device according to claim 1, wherein each of the arm rests includes:
   a wire extending between a rotating shaft of the arm rest and the slide member, and
   a spring that urges the slide member away from the rotating shaft, wherein
   a first end portion of the wire is wound about a periphery of the rotating shaft, and
   as the arm rest is rotated from the storage position to the use position, the first end portion of the wire is taken up on the periphery of the rotating shaft.

5. The vehicle seat belt device according to claim 1, wherein each of the arm rests includes:
   a first gear attached to a rotating shaft of the arm rest,
   a pulley having a second gear that has a fewer number of teeth than the first gear and meshes with the first gear,
   a wire extending between the pulley and the slide member, and
   a spring that urges the slide member away from the rotating shaft, wherein
   a first end portion of the wire is wound about the pulley, and
   as the arm rest is rotated from the storage position to the use position, the first end portion of the wire is taken up on the pulley.

6. An occupant protection system comprising:
   the vehicle seat belt device according to claim 1;
   an airbag configured as a single bag that is stored in the head rest of the vehicle seat, and that is inflated and deployed upon being supplied with gas, the airbag deploying in a seat forward direction and in seat sideward directions to cover a head of the occupant; and
   an upper body restraining portion that is disposed at a forwardly deploying portion of the airbag on a seat front side of the airbag, the upper body restraining portion configured to restrain at least one of a breast and shoulders of the occupant.

7. A vehicle seat belt device comprising:
   a pair of arm rests that are disposed on first and second width direction sides of a seat back of a vehicle seat and that are rotatable between a storage position, in which the arm rests extend substantially vertically, and a use position, in which the arm rests are tilted in a seat forward direction from the storage position and extend substantially horizontally;
   slide members that are respectively disposed at the pair of arm rests and that are slidable along the arm rests, distal end portions of the slide members having belt guides through which webbing of a belt is passed;
   a first belt anchor that is disposed on the first width direction side of a lower portion of the seat back, and to which a first end portion of the webbing is attached;
   a second belt anchor that is disposed on the second width direction side of the lower portion of the seat back, and in which the webbing extending from the first belt anchor is looped after having passed through the belt guides on both of the first and second width direction sides;
   a retractor that is disposed on one seat width direction end side of an upper end portion of the seat back, and that takes up a second end portion of the webbing that has been looped through the second belt anchor and passed through the belt guide on the second width direction side; and
   an electronic control unit that, (i) in a state before an occupant is seated in the vehicle seat, causes the pair of arm rests to be held in the storage position and causes the slide members to be held in a state in which the slide members have been moved further in a seat upward direction than a head rest of the vehicle seat, and that, (ii) in a state in which the occupant is seated, causes the pair of arm rests to rotate from the storage position to the use position, causes the slide members to slide toward base sides of the arm rests, and causes a predetermined amount of the webbing to be taken up by the retractor.

8. The vehicle seat belt device according to claim 7, further comprising:
   a tubular member that is flexible and, in a state in which the arm rests are held in the storage position, extends from the retractor along a side portion of the head rest to a position further in the seat upward direction than the head rest and further on the first width direction end side than the head rest, wherein
   the webbing is inserted into the tubular member.

9. The vehicle seat belt device according to claim 7, further comprising extendable and contractible coupling members that couple the belt guides to the slide members.

10. The vehicle seat belt device according to claim 7, wherein the electronic control unit causes the predetermined amount of the webbing to be taken up by the retractor at a time of a crash of the vehicle or at a time at which a crash of the vehicle is predicted.

11. The vehicle seat belt device according to claim 7, wherein each of the arm rests includes:
    a wire extending between a rotating shaft of the arm rest and the slide member, and
    a spring that urges the slide member away from the rotating shaft, wherein
    a first end portion of the wire is wound about a periphery of the rotating shaft, and
    as the arm rest is rotated from the storage position to the use position, the first end portion of the wire is taken up on the periphery of the rotating shaft.

12. The vehicle seat belt device according to claim 7, wherein each of the arm rests includes:
    a first gear attached to a rotating shaft of the arm rest,
    a pulley having a second gear that has a fewer number of teeth than the first gear and meshes with the first gear,
    a wire extending between the pulley and the slide member, and
    a spring that urges the slide member away from the rotating shaft; wherein
    a first end portion of the wire is wound about the pulley, and
    as the arm rest is rotated from the storage position to the use position, the first end portion of the wire is taken up on the pulley.

13. An occupant protection system comprising:
    the vehicle seat belt device according to claim 7;
    an airbag configured as a single bag that is stored in the head rest of the vehicle seat, and that is inflated and deployed upon being supplied with gas, the airbag deploying in a seat forward direction and in seat sideward directions to cover a head of the occupant; and an upper body restraining portion that is disposed at a forwardly deploying portion of the airbag deployed on a seat front side, the upper body restraining portion configured to restrain at least one of a breast and shoulders of the occupant.

* * * * *